US012712112B2

(12) United States Patent
Yamada et al.

(10) Patent No.: US 12,712,112 B2
(45) Date of Patent: Aug. 18, 2026

(54) LAMINATED COIL COMPONENT

(71) Applicant: Murata Manufacturing Co., Ltd., Kyoto-fu (JP)

(72) Inventors: Shoyo Yamada, Nagaokakyo (JP); Reiji Ozawa, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 728 days.

(21) Appl. No.: 18/191,854

(22) Filed: Mar. 28, 2023

(65) Prior Publication Data

US 2023/0317353 A1 Oct. 5, 2023

(30) Foreign Application Priority Data

Mar. 30, 2022 (JP) ................................ 2022-056387

(51) Int. Cl.
*H01F 27/28* (2006.01)
*H01F 27/29* (2006.01)

(52) U.S. Cl.
CPC ....... *H01F 27/2804* (2013.01); *H01F 27/292* (2013.01)

(58) Field of Classification Search
CPC ........................... H01F 27/2804; H01F 27/292
See application file for complete search history.

(56) References Cited

U.S. PATENT DOCUMENTS 6,189,200 B1 * 2/2001 Takeuchi .............. H01F 41/043 336/200
6,218,925 B1 * 4/2001 Iwao ..................... H01F 27/292 336/200
6,675,462 B1 * 1/2004 Takahashi ............. H01F 27/292 336/200
2014/0253277 A1 * 9/2014 Takezawa ........... H01F 17/0013 336/200
2015/0294779 A1 * 10/2015 Lim ...................... H01F 27/292 336/192

FOREIGN PATENT DOCUMENTS

CN 104979070 A 10/2015
CN 105408972 A 3/2016
(Continued)

*Primary Examiner* — Malcolm Barnes
(74) *Attorney, Agent, or Firm* — Studebaker Brackett PLLC

(57) ABSTRACT

A laminated coil component including a body in which insulating layers are laminated in a laminating direction; a coil in the body; and an outer electrode on a surface of the body and electrically connected to the coil. The coil includes coil conductors laminated in the laminating direction that are electrically connected by a via conductor that penetrates the insulating layers in the laminating direction. The coil conductors include a first laminated part including adjacent coil conductors including an outermost coil conductor at an outermost position in the laminating direction. The first laminated part has first parallel sections in which all of the coil conductors of the first laminated part overlap each other when viewed in the laminating direction. The first parallel sections are connected in parallel by the via conductor, and the outermost coil conductor is electrically connected to the same outer electrode by first and second lead-out conductors.

20 Claims, 8 Drawing Sheets

(56) References Cited

FOREIGN PATENT DOCUMENTS

| | | | | | |
|---|---|---|---|---|---|
| JP | H11-260644 | A | | 9/1999 | |
| JP | 2001-93730 | A | | 4/2001 | |
| JP | 2001093730 | A | * | 4/2001 | |
| JP | 2009044030 | A | * | 2/2009 | |
| JP | 2011-049491 | A | | 3/2011 | |
| JP | 2011049492 | A | * | 3/2011 | |
| JP | 2014-157919 | A | | 8/2014 | |
| JP | WO2015022889 | A1 | * | 3/2017 | ......... H01F 17/0013 |
| WO | 2015/022889 | A1 | | 2/2015 | |

* cited by examiner

LAMINATED COIL COMPONENT

CROSS-REFERENCE TO RELATED APPLICATION

This application claims benefit of priority to Japanese Patent Application No. 2022-056387, filed Mar. 30, 2022, the entire content of which is incorporated herein by reference.

BACKGROUND

Technical Field

The present disclosure relates to a laminated coil component.

Background Art

International Publication No. 2015/022889 discloses an electronic component including a multilayer body having a rectangular parallelepiped shape in which a plurality of insulator layers are laminated in a laminating direction and having a first side surface formed by continuous outer edges of the plurality of insulator layers; a spiral coil that is provided in the multilayer body, is constituted by a plurality of coil conductors connected by a via-hole conductor penetrating the insulator layers, and extends in the laminating direction while spiraling; a first outer electrode provided at least on the first side surface; and a second outer electrode provided on a side opposite to the first outer electrode in the laminating direction and is provided at least on the first side surface. The coil has first parallel units in which at least some of m coil conductors arranged in the laminating direction are connected in parallel and second parallel units in which at least some of n coil conductors arranged in the laminating direction are connected in parallel. In this configuration, m and n are natural numbers, n is larger than m, and a proportion of the number of first parallel units in a sum of the number of first parallel units and the number of second parallel units in a first region that overlaps the first outer electrode in plan view viewed from a direction normal to the first side surface is higher than a proportion of the number of first parallel units in a sum of the number of first parallel units and the number of second parallel units in a second region that does not overlap the first outer electrode and a second outer electrode in plan view viewed from the direction normal to the first side surface.

SUMMARY

FIG. 2 of International Publication No. 2015/022889 discloses an electronic component in which two or three coil conductors are connected in parallel. In the electronic component illustrated in FIG. 2 of International Publication No. 2015/022889, a coil and an outer electrode are connected by a lead-out conductor including a plurality of via-hole conductors penetrating insulator layers. However, as a result of studies conducted by the inventors of the present disclosure, it was revealed that the electronic component illustrated in FIG. 2 of International Publication No. 2015/022889 has the following problem.

In the electronic component illustrated in FIG. 2 of International Publication No. 2015/022889, two or three coil conductors are connected in parallel, and it is therefore conceivable that a cross-sectional area of the coil orthogonal to a direction along a coil current path, that is, a direction in which the coil conductors extend increases accordingly. It is therefore conceivable that in the electronic component illustrated in FIG. 2 of International Publication No. 2015/022889, direct-current resistance (Rdc) of the coil is low, and a large current can be passed through the coil.

However, if a large current is passed through the coil in the electronic component illustrated in FIG. 2 of International Publication No. 2015/022889, a large current also passes through the lead-out conductor. This leads to a risk of occurrence of heat generation and electrochemical migration in the lead-out conductor. In the electronic component illustrated in FIG. 2 of International Publication No. 2015/022889, the coil and the outer electrode are electrically connected by a single lead-out conductor, and therefore, the electronic component undesirably becomes unable to function if disconnection occurs in the lead-out conductor due to heat generation and electrochemical migration.

Accordingly, the present disclosure provides a laminated coil component in which heat generation and electrochemical migration are less likely to occur in a lead-out conductor.

A laminated coil component according to the present disclosure includes a body in which a plurality of insulating layers are laminated in a laminating direction; a coil provided in the body; and an outer electrode provided on a surface of the body and electrically connected to the coil, in which the coil is configured such that a plurality of coil conductors laminated in the laminating direction are electrically connected by a via conductor that penetrates the insulating layers in the laminating direction. The plurality of coil conductors laminated in the laminating direction include a first laminated part including a plurality of adjacent coil conductors including an outermost coil conductor located at an outermost position in the laminating direction among the plurality of coil conductors. The first laminated part has first parallel sections in which all of the coil conductors that constitute the first laminated part overlap each other when viewed in the laminating direction. The first parallel sections are connected in parallel by the via conductor, and the outermost coil conductor is electrically connected to the same outer electrode by a first lead-out conductor at one end of the first parallel section and by a second lead-out conductor at the other end of the first parallel section.

According to the present disclosure, it is possible to provide a laminated coil component in which heat generation and electrochemical migration are less likely to occur in a lead-out conductor.

DETAILED DESCRIPTION

A laminated coil component according to the present disclosure is described below. Note that the present disclosure is not limited to the following configurations, and the following configurations can be changed as appropriate without departing from the spirit of the present disclosure. Furthermore, combinations of preferable configurations described below are also encompassed in the present disclosure.

Needless to say, embodiments below are illustrative examples, and partial substitution or combination of configurations described in different embodiments is also possible. In the second and subsequent embodiments, description of matters identical to those in the first embodiment is omitted, and differences are mainly described. In particular, similar action and effects produced by a similar configuration are not repeatedly mentioned in each embodiment.

Hereinafter, an expression "laminated coil component according to the present disclosure" is used in a case where the embodiments are not distinguished.

The drawings illustrated below are schematic views, and dimensions, aspect ratios, and the like thereof are sometimes different from those of an actual product.

A laminated coil component according to the present disclosure includes a body in which a plurality of insulating layers are laminated in a laminating direction; a coil provided in the body; and an outer electrode provided on a surface of the body and electrically connected to the coil, in which the coil is configured such that a plurality of coil conductors laminated in the laminating direction are electrically connected by a via conductor that penetrates the insulating layers in the laminating direction. The plurality of coil conductors laminated in the laminating direction include a first laminated part including a plurality of adjacent coil conductors including an outermost coil conductor located at an outermost position in the laminating direction among the plurality of coil conductors. The first laminated part has first parallel sections in which all of the coil conductors that constitute the first laminated part overlap each other when viewed in the laminating direction. The first parallel sections are connected in parallel by the via conductor, and the outermost coil conductor is electrically connected to the same outer electrode by a first lead-out conductor at one end of the first parallel section and by a second lead-out conductor at the other end of the first parallel section.

First Embodiment

An example of the laminated coil component according to the present disclosure is described as a laminated coil component according to a first embodiment of the present disclosure.

Figure 1:
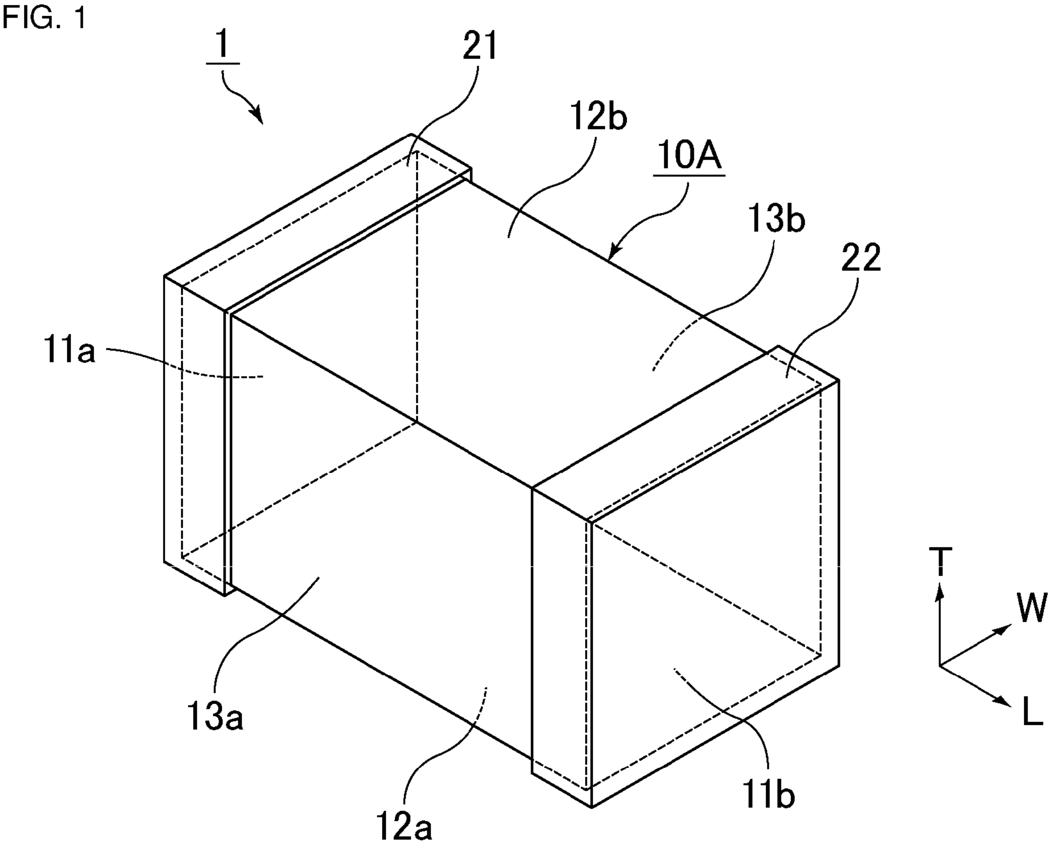
FIG. 1 is a perspective schematic view illustrating an example of a laminated coil component according to a first embodiment of the present disclosure.

FIG. 1 is a perspective schematic view illustrating an example of the laminated coil component according to the first embodiment of the present disclosure.

A laminated coil component 1 illustrated in FIG. 1 includes a body 10A, a first outer electrode 21, and a second outer electrode 22. The laminated coil component 1 also includes a coil (not illustrated in FIG. 1) that is provided in the body 10A, as described later.

In the specification, a length direction, a height direction, and a width direction are defined by L, T, and W, respectively, as illustrated in FIG. 1 and other drawings. The length direction L, the height direction T, and the width direction W are orthogonal to one another.

The body 10A has a first end surface 11 a and a second end surface 11*b* that face each other in the length direction L, a first main surface 12*a* and a second main surface 12*b* that face each other in the height direction T, and a first side surface 13*a* and a second side surface 13*b* that face each other in the width direction W, and has, for example, a rectangular parallelepiped shape or a substantially rectangular parallelepiped shape.

The first end surface 11*a* and the second end surface 11*b* of the body 10A need not be strictly orthogonal to the length direction L. The first main surface 12*a* and the second main surface 12*b* of the body 10A need not be strictly orthogonal to the height direction T. The first side surface 13*a* and the second side surface 13*b* of the body 10A need not be strictly orthogonal to the width direction W.

In a case where the laminated coil component 1 is mounted on a substrate, the first main surface 12*a* of the body 10A serves as a mount surface.

Corners and ridge portions of the body 10A are preferably rounded. The corners of the body 10A are portions where three surfaces of the body 10A intersect. The ridge portions of the body 10A are portions where two surfaces of the body 10A intersect.

The first outer electrode 21 is provided on surfaces of the body 10A. More specifically, the first outer electrode 21 extends from the first end surface 11*a* of the body 10A over portions of the first main surface 12*a*, the second main surface 12*b*, the first side surface 13*a*, and the second side surface 13*b*.

A manner in which the first outer electrode 21 is disposed is not limited to the one illustrated in FIG. 1. For example, the first outer electrode 21 may extend from a portion of the first main surface 12*a* of the body 10A over portions of the first end surface 11*a*, the first side surface 13*a*, and the second side surface 13*b*.

The second outer electrode 22 is provided on surfaces of the body 10A. More specifically, the second outer electrode 22 extends from the second end surface 11*b* of the body 10A over portions of the first main surface 12*a*, the second main surface 12*b*, the first side surface 13*a*, and the second side surface 13*b*.

A manner in which the second outer electrode 22 is disposed is not limited to the one illustrated in FIG. 1. For example, the second outer electrode 22 may extend from a portion of the first main surface 12*a* of the body 10A over portions of the second end surface 11*b*, the first side surface 13*a*, and the second side surface 13*b*.

As described above, the first outer electrode 21 and the second outer electrode 22 are provided apart from each other on the surfaces of the body 10A.

As described above, the first outer electrode 21 and the second outer electrode 22 are provided on the first main surface 12*a* of the body 10A, which is a mount surface, and therefore mountability of the laminated coil component 1 improves.

The first outer electrode 21 and the second outer electrode 22 may each have a single-layer structure or may each have a multilayer structure.

In a case where the first outer electrode 21 and the second outer electrode 22 each have a single-layer structure, each outer electrode is, for example, made of a material such as Ag, Au, Cu, Pd, Ni, Al, or an alloy containing at least one kind of metal selected from among these metals.

In a case where the first outer electrode 21 and the second outer electrode 22 each have a multilayer structure, each outer electrode may have, for example, a base electrode containing Ag, an Ni-plated electrode, and an Sn-plated electrode in this order from a surface side of the body 10A.

Figure 2:
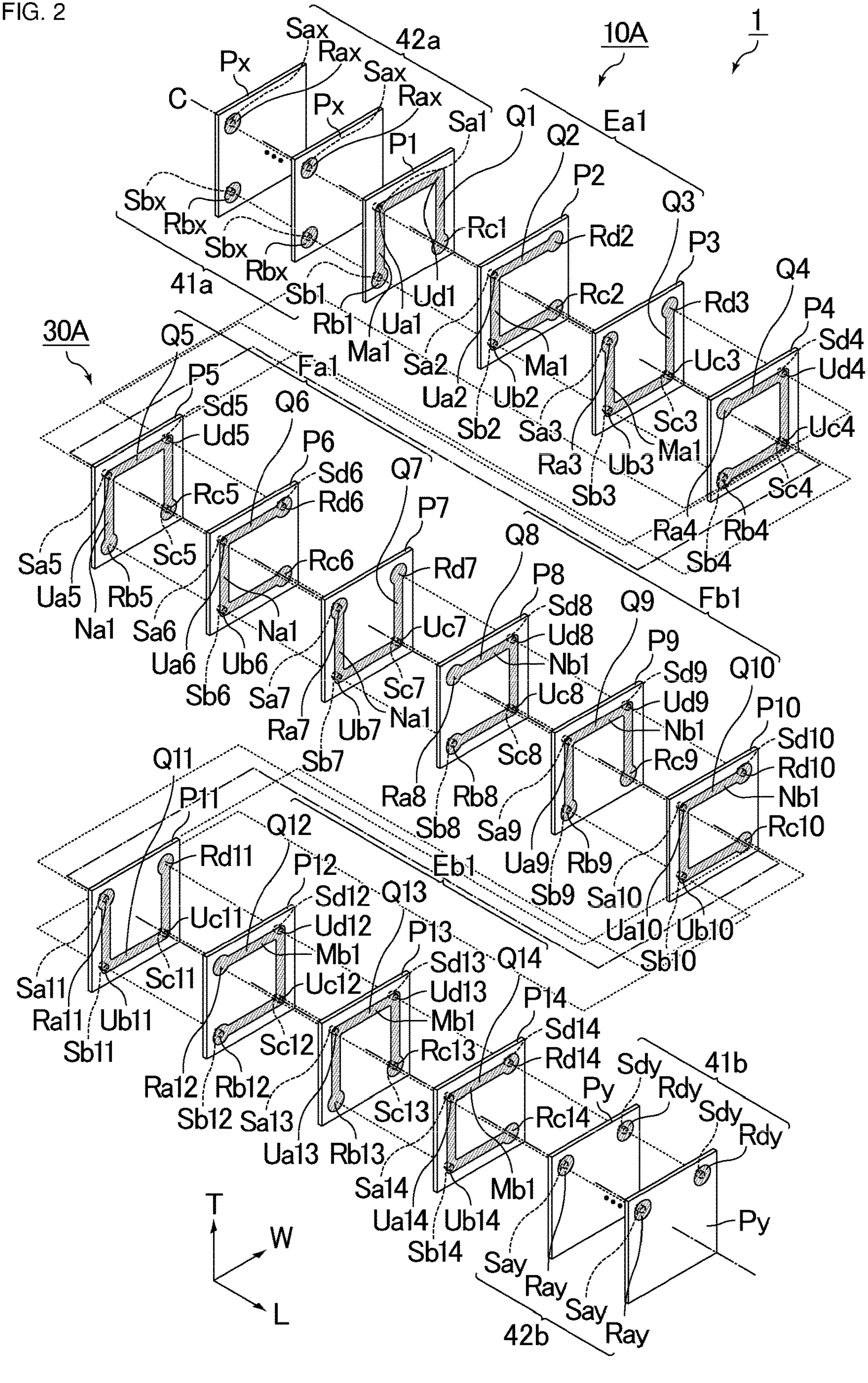
FIG. 2 is a perspective schematic view illustrating an example of an exploded state of the laminated coil component (excluding outer electrodes) illustrated in FIG. 1.
Figure 3:
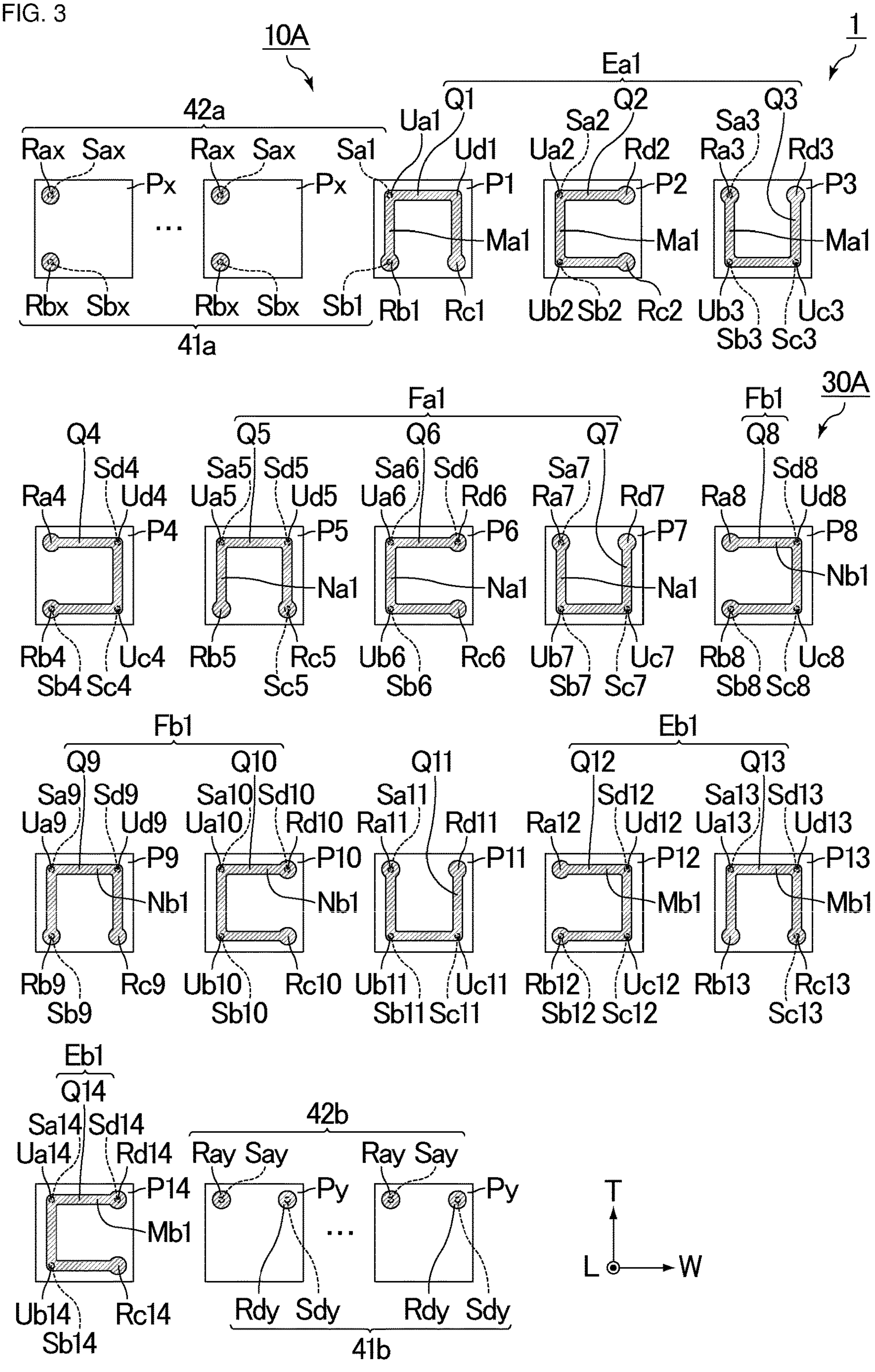
FIG. 3 is a plan schematic view illustrating an example of an exploded state of the laminated coil component (excluding outer electrodes) illustrated in FIG. 1.

FIG. 2 is a perspective schematic view illustrating an example of an exploded state of the laminated coil component (excluding the outer electrodes) illustrated in FIG. 1. FIG. 3 is a plan schematic view illustrating an example of an exploded state of the laminated coil component (excluding the outer electrodes) illustrated in FIG. 1.

As illustrated in FIGS. 2 and 3, the body 10A includes a plurality of insulating layers laminated in a laminating direction (the length direction L in this example).

The body 10A includes an insulating layer Pb, an insulating layer P2, an insulating layer P3, an insulating layer P4, an insulating layer P5, an insulating layer P6, an insulating layer P7, an insulating layer P8, an insulating layer P9, an insulating layer P10, an insulating layer P11, an insulating layer P12, an insulating layer P13, and an insulating layer P14 in this order in the length direction L from the first end surface 11 a side toward the second end surface 11*b* side.

Each of the insulating layers is, for example, made of a magnetic material such as a ferrite material.

The ferrite material is preferably an Ni—Cu—Zn ferrite material.

The Ni—Cu—Zn ferrite material preferably contains 40 mol % or more and 49.5 mol % or less (i.e., from 40 mol % to 49.5 mol %) of Fe in terms of $Fe_2O_3$, 2 mol % or more and 35 mol % or less (i.e., from 2 mol % to 35 mol %) of Zn in terms of ZnO, and 6 mol % or more and 13 mol % or less (i.e., from 6 mol % to 13 mol %) of Cu in terms of CuO, and 10 mol % or more and 45 mol % or less (i.e., from 10 mol % to 45 mol %) of Ni in terms of NiO when a whole amount is 100 mol %.

The Ni—Cu—Zn ferrite material may further contain an additive such as Co, Bi, Sn, or Mn.

The Ni—Cu—Zn ferrite material may further contain unavoidable impurities.

A coil 30A is provided inside the body 10A.

As illustrated in FIGS. 2 and 3, the coil 30A includes a coil conductor Q1, a coil conductor Q2, a coil conductor Q3, a coil conductor Q4, a coil conductor Q5, a coil conductor Q6, a coil conductor Q7, a coil conductor Q8, a coil conductor Q9, a coil conductor Q10, a coil conductor Q11, a coil conductor Q12, a coil conductor Q13, and a coil conductor Q14 in this order in the length direction L.

The coil conductor Q1 has a U shape and is provided on a main surface of the insulating layer P1.

The coil conductor Q1 has a land portion Rb1 and a land portion Rc1 at different end portions thereof.

The coil conductor Q1 has a bent portion Ua1 and a bent portion Udl.

The coil conductor Q2 has a U shape and is provided on a main surface of the insulating layer P2.

The coil conductor Q2 has a land portion Rc2 and a land portion Rd2 at different end portions thereof.

The coil conductor Q2 has a bent portion Ua2 and a bent portion Ub2.

The bent portion Ua2 is connected to a via conductor Sa2 that penetrates the insulating layer P2 in the length direction L. The via conductor Sa2 is also connected to the bent portion Ua1 in addition to the bent portion Ua2. That is, the bent portion Ua1 and the bent portion Ua2 are electrically connected by the via conductor Sa2.

The bent portion Ub2 is connected to a via conductor Sb2 that penetrates the insulating layer P2 in the length direction L. The via conductor Sb2 is also connected to the land portion Rb1 in addition to the bent portion Ub2. That is, the land portion Rb1 and the bent portion Ub2 are electrically connected by the via conductor Sb2.

The coil conductor Q3 has a U shape and is provided on a main surface of the insulating layer P3.

The coil conductor Q3 has a land portion Ra3 and a land portion Rd3 at different end portions thereof.

The land portion Ra3 is connected to a via conductor Sa3 that penetrates the insulating layer P3 in the length direction L. The via conductor Sa3 is also connected to the bent portion Ua2 in addition to the land portion Ra3. That is, the bent portion Ua2 and the land portion Ra3 are electrically connected by the via conductor Sa3.

The coil conductor Q3 has a bent portion Ub3 and a bent portion Uc3.

The bent portion Ub3 is connected to a via conductor Sb3 that penetrates the insulating layer P3 in the length direction L. The via conductor Sb3 is also connected to the bent portion Ub2 in addition to the bent portion Ub3. That is, the bent portion Ub2 and the bent portion Ub3 are electrically connected by the via conductor Sb3.

The bent portion Uc3 is connected to a via conductor Sc3 that penetrates the insulating layer P3 in the length direction L. The via conductor Sc3 is also connected to the land portion Rc2 in addition to the bent portion Uc3. That is, the land portion Rc2 and the bent portion Uc3 are electrically connected by the via conductor Sc3.

The coil conductor Q4 has a U shape and is provided on a main surface of the insulating layer P4.

The coil conductor Q4 has a land portion Ra4 and a land portion Rb4 at different end portions thereof.

The land portion Rb4 is connected to a via conductor Sb4 that penetrates the insulating layer P4 in the length direction L. The via conductor Sb4 is also connected to the bent portion Ub3 in addition to the land portion Rb4. That is, the bent portion Ub3 and the land portion Rb4 are electrically connected by the via conductor Sb4.

The coil conductor Q4 has a bent portion Uc4 and a bent portion Ud4.

The bent portion Uc4 is connected to a via conductor Sc4 that penetrates the insulating layer P4 in the length direction L. The via conductor Sc4 is also connected to the bent portion Uc3 in addition to the bent portion Uc4. That is, the bent portion Uc3 and the bent portion Uc4 are electrically connected by the via conductor Sc4.

The bent portion Ud4 is connected to a via conductor Sd4 that penetrates the insulating layer P4 in the length direction L. The via conductor Sd4 is also connected to the land portion Rd3 in addition to the bent portion Ud4. That is, the land portion Rd3 and the bent portion Ud4 are electrically connected by the via conductor Sd4.

The coil conductor Q5 has a U shape and is provided on a main surface of the insulating layer P5.

The coil conductor Q5 has a land portion Rb5 and a land portion Rc5 at different end portions thereof.

The land portion Rc5 is connected to a via conductor Sc5 that penetrates the insulating layer P5 in the length direction L. The via conductor Sc5 is also connected to the bent portion Uc4 in addition to the land portion Rc5. That is, the bent portion Uc4 and the land portion Rc5 are electrically connected by the via conductor Sc5.

The coil conductor Q5 has a bent portion Ua5 and a bent portion Ud5.

The bent portion Ua5 is connected to a via conductor Sa5 that penetrates the insulating layer P5 in the length direction L. The via conductor Sa5 is also connected to the land portion Ra4 in addition to the bent portion Ua5. That is, the land portion Ra4 and the bent portion Ua5 are electrically connected by the via conductor Sa5.

The bent portion Ud5 is connected to a via conductor Sd5 that penetrates the insulating layer P5 in the length direction L. The via conductor Sd5 is also connected to the bent portion Ud4 in addition to the bent portion Ud5. That is, the bent portion Ud4 and the bent portion Ud5 are electrically connected by the via conductor Sd5.

The coil conductor Q6 has a U shape and is provided on a main surface of the insulating layer P6.

The coil conductor Q6 has a land portion Rc6 and a land portion Rd6 at different end portions thereof.

The land portion Rd6 is connected to a via conductor Sd6 that penetrates the insulating layer P6 in the length direction L. The via conductor Sd6 is also connected to the bent portion Ud5 in addition to the land portion Rd6. That is, the bent portion Ud5 and the land portion Rd6 are electrically connected by the via conductor Sd6.

The coil conductor Q6 has a bent portion Ua6 and a bent portion Ub6.

The bent portion Ua6 is connected to a via conductor Sa6 that penetrates the insulating layer P6 in the length direction L. The via conductor Sa6 is also connected to the bent portion Ua5 in addition to the bent portion Ua6. That is, the bent portion Ua5 and the bent portion Ua6 are electrically connected by the via conductor Sa6.

The bent portion Ub6 is connected to a via conductor Sb6 that penetrates the insulating layer P6 in the length direction L. The via conductor Sb6 is also connected to the land portion Rb5 in addition to the bent portion Ub6. That is, the land portion Rb5 and the bent portion Ub6 are electrically connected by the via conductor Sb6.

The coil conductor Q7 has a U shape and is provided on a main surface of the insulating layer P7.

The coil conductor Q7 has a land portion Ra7 and a land portion Rd7 at different end portions thereof.

The land portion Ra7 is connected to a via conductor Sa7 that penetrates the insulating layer P7 in the length direction L. The via conductor Sa7 is also connected to the bent portion Ua6 in addition to the land portion Ra7. That is, the bent portion Ua6 and the land portion Ra7 are electrically connected by the via conductor Sa1.

The coil conductor Q7 has a bent portion Ub7 and a bent portion Uc7.

The bent portion Ub7 is connected to a via conductor Sb7 that penetrates the insulating layer P7 in the length direction L. The via conductor Sb7 is also connected to the bent portion Ub6 in addition to the bent portion Ub7. That is, the bent portion Ub6 and the bent portion Ub7 are electrically connected by the via conductor Sb7.

The bent portion Uc7 is connected to a via conductor Sc7 that penetrates the insulating layer P7 in the length direction L. The via conductor Sc7 is also connected to the land portion Rc6 in addition to the bent portion Uc7. That is, the land portion Rc6 and the bent portion Uc7 are electrically connected by the via conductor Sc7.

The coil conductor Q8 has a U shape and is provided on a main surface of the insulating layer P8.

The coil conductor Q8 has a land portion Rab and a land portion Rb8 at different end portions thereof.

The land portion Rb8 is connected to a via conductor Sb8 that penetrates the insulating layer P8 in the length direction L. The via conductor Sb8 is also connected to the bent portion Ub7 in addition to the land portion Rb8. That is, the bent portion Ub7 and the land portion Rb8 are electrically connected by the via conductor Sb8.

The coil conductor Q8 has a bent portion Uc8 and a bent portion Ud8.

The bent portion Uc8 is connected to a via conductor Sc8 that penetrates the insulating layer P8 in the length direction L. The via conductor Sc8 is also connected to the bent portion Uc7 in addition to the bent portion Uc8. That is, the bent portion Uc7 and the bent portion Uc8 are electrically connected by the via conductor Sc8.

The bent portion Ud8 is connected to a via conductor Sd8 that penetrates the insulating layer P8 in the length direction L. The via conductor Sd8 is also connected to the land portion Rd7 in addition to the bent portion Ud8. That is, the land portion Rd7 and the bent portion Ud8 are electrically connected by the via conductor Sd8.

The coil conductor Q9 has a U shape and is provided on a main surface of the insulating layer P9.

The coil conductor Q9 has a land portion Rb9 and a land portion Rc9 at different end portions thereof.

The land portion Rb9 is connected to a via conductor Sb9 that penetrates the insulating layer P9 in the length direction L. The via conductor Sb9 is also connected to the land portion Rb8 in addition to the land portion Rb9. That is, the land portion Rb8 and the land portion Rb9 are electrically connected by the via conductor Sb9.

The coil conductor Q9 has a bent portion Ua9 and a bent portion Ud9.

The bent portion Ua9 is connected to a via conductor Sa9 that penetrates the insulating layer P9 in the length direction L. The via conductor Sa9 is also connected to the land portion Ra8 in addition to the bent portion Ua9. That is, the land portion Ra8 and the bent portion Ua9 are electrically connected by the via conductor Sa9.

The bent portion Ud9 is connected to a via conductor Sd9 that penetrates the insulating layer P9 in the length direction L. The via conductor Sd9 is also connected to the bent portion Ud8 in addition to the bent portion Ud9. That is, the bent portion Ud8 and the bent portion Ud9 are electrically connected by the via conductor Sd9.

The coil conductor Q10 has a U shape and is provided on a main surface of the insulating layer P10.

The coil conductor Q10 has a land portion Rc10 and a land portion Rd10 at different end portions thereof.

The land portion Rd10 is connected to a via conductor Sd10 that penetrates the insulating layer P10 in the length direction L. The via conductor Sd10 is also connected to the bent portion Ud9 in addition to the land portion Rd10. That is, the bent portion Ud9 and the land portion Rd10 are electrically connected by the via conductor Sd10.

The coil conductor Q10 has a bent portion Ua10 and a bent portion Ub10.

The bent portion Ua10 is connected to a via conductor Sa1° that penetrates the insulating layer P10 in the length direction L. The via conductor Sa10 is also connected to the bent portion Ua9 in addition to the bent portion Ua10. That is, the bent portion Ua9 and the bent portion Ua10 are electrically connected by the via conductor Sa10.

The bent portion Ub10 is connected to a via conductor Sb10 that penetrates the insulating layer P10 in the length direction L. The via conductor Sb10 is also connected to the land portion Rb9 in addition to the bent portion Ub10. That is, the land portion Rb9 and the bent portion Ub10 are electrically connected by the via conductor Sb10.

The coil conductor Q11 has a U shape and is provided on a main surface of the insulating layer P11.

The coil conductor Q11 has a land portion Ra11 and a land portion Rd11 at different end portions thereof.

The land portion Ra11 is connected to a via conductor Sa11 that penetrates the insulating layer P11 in the length direction L. The via conductor Sa11 is also connected to the bent portion Ua10 in addition to the land portion Ra11. That is, the bent portion Ua10 and the land portion Ra11 are electrically connected by the via conductor Sa11.

The coil conductor Q11 has a bent portion Ub11 and a bent portion Uc11.

The bent portion Ub11 is connected to a via conductor Sb11 that penetrates the insulating layer P11 in the length direction L. The via conductor Sb11 is also connected to the bent portion Ub10 in addition to the bent portion Ub11. That is, the bent portion Ub10 and the bent portion Ub11 are electrically connected by the via conductor Sb11.

The bent portion Uc11 is connected to a via conductor Sc11 that penetrates the insulating layer P11 in the length direction L. The via conductor Sc11 is also connected to the land portion Rc10 in addition to the bent portion Uc11. That is, the land portion Rc10 and the bent portion Uc11 are electrically connected by the via conductor Sell.

The coil conductor Q12 has a U shape and is provided on a main surface of the insulating layer P12.

The coil conductor Q12 has a land portion Ra12 and a land portion Rb12 at different end portions thereof.

The land portion Rb12 is connected to a via conductor Sb12 that penetrates the insulating layer P12 in the length direction L. The via conductor Sb12 is also connected to the bent portion Ub11 in addition to the land portion Rb12. That is, the bent portion Ub11 and the land portion Rb12 are electrically connected by the via conductor Sb12.

The coil conductor Q12 has a bent portion Uc12 and a bent portion Ud12.

The bent portion Uc12 is connected to a via conductor Sc12 that penetrates the insulating layer P12 in the length direction L. The via conductor Sc12 is also connected to the bent portion Uc11 in addition to the bent portion Uc12. That is, the bent portion Uc11 and the bent portion Uc12 are electrically connected by the via conductor Sc12.

The bent portion Ud12 is connected to a via conductor Sd12 that penetrates the insulating layer P12 in the length direction L. The via conductor Sd12 is also connected to the land portion Rd11 in addition to the bent portion Ud12. That is, the land portion Rd11 and the bent portion Ud12 are electrically connected by the via conductor Sd12.

The coil conductor Q13 has a U shape and is provided on a main surface of the insulating layer P13.

The coil conductor Q13 has a land portion Rb13 and a land portion Rc13 at different end portions thereof.

The land portion Rc13 is connected to a via conductor Sc13 that penetrates the insulating layer P13 in the length direction L. The via conductor Sc13 is also connected to the bent portion Uc12 in addition to the land portion Rc13. That is, the bent portion Uc12 and the land portion Rc13 are electrically connected by the via conductor Sc13.

The coil conductor Q13 has a bent portion Ua13 and a bent portion Ud13.

The bent portion Ua13 is connected to a via conductor Sa13 that penetrates the insulating layer P13 in the length direction L. The via conductor Sa13 is also connected to the land portion Ra12 in addition to the bent portion Ua13. That is, the land portion Ra12 and the bent portion Ua13 are electrically connected by the via conductor Sa13.

The bent portion Ud13 is connected to a via conductor Sd13 that penetrates the insulating layer P13 in the length direction L. The via conductor Sd13 is also connected to the bent portion Ud12 in addition to the bent portion Ud13. That is, the bent portion Ud12 and the bent portion Ud13 are electrically connected by the via conductor Sd13.

The coil conductor Q14 has a U shape and is provided on a main surface of the insulating layer P14.

The coil conductor Q14 has a land portion Rc14 and a land portion Rd14 at different end portions thereof.

The land portion Rd14 is connected to a via conductor Sd14 that penetrates the insulating layer P14 in the length direction L. The via conductor Sd14 is also connected to the bent portion Ud13 in addition to the land portion Rd14. That is, the bent portion Ud13 and the land portion Rd14 are electrically connected by the via conductor Sd14.

The coil conductor Q14 has a bent portion Ua14 and a bent portion Ub14.

The bent portion Ua14 is connected to a via conductor Sa14 that penetrates the insulating layer P14 in the length direction L. The via conductor Sa14 is also connected to the bent portion Ua13 in addition to the bent portion Ua14. That is, the bent portion Ua13 and the bent portion Ua14 are electrically connected by the via conductor Sa14.

The bent portion Ub14 is connected to a via conductor Sb14 that penetrates the insulating layer P14 in the length direction L. The via conductor Sb14 is also connected to the land portion Rb13 in addition to the bent portion Ub14. That is, the land portion Rb13 and the bent portion Ub14 are electrically connected by the via conductor Sb14.

In the specification, the U shape can be any shape that has three sides including two adjacent sides substantially orthogonal to each other and need not necessarily be a shape that has three sides including two adjacent sides strictly orthogonal to each other.

In the laminated coil component 1, the insulating layer P1, the insulating layer P2, the insulating layer P3, the insulating layer P4, the insulating layer P5, the insulating layer P6, the insulating layer P7, the insulating layer P8, the insulating layer P9, the insulating layer P10, the insulating layer P11, the insulating layer P12, the insulating layer P13, and the insulating layer P14 are laminated in this order in the length direction L, as described above. Accordingly, the coil conductor Q1, the coil conductor Q2, the coil conductor Q3, the coil conductor Q4, the coil conductor Q5, the coil conductor Q6, the coil conductor Q7, the coil conductor Q8, the coil conductor Q9, the coil conductor Q10, the coil conductor Q11, the coil conductor Q12, the coil conductor Q13, and the coil conductor Q14 are laminated in this order in the length direction L together with the insulating layers and are electrically connected by the via conductors to constitute the coil 30A.

The coil 30A is, for example, solenoidal.

When viewed in the length direction L, the coil 30A may have a shape (e.g., a polygonal shape) constituted by straight lines such as the one illustrated in FIGS. 2 and 3, may have a shape (e.g., a circular shape) constituted by a curve, or may have a shape constituted by a straight line and a curve.

In the laminated coil component according to the present disclosure, the laminating direction and a direction of a coil axis of the coil are parallel with the mount surface of the body along a same direction.

In the body 10A, the laminating direction in which the insulating layers are laminated is parallel with the length direction L. That is, the laminating direction in which the insulating layers are laminated is parallel with the first main surface 12*a* of the body 10A, which is the mount surface.

The coil 30A has a coil axis C. The coil axis C of the coil 30A is a central axis of the coil 30A viewed in the length direction L and extends in the length direction L. That is, the direction of the coil axis C of the coil 30A is parallel with the first main surface 12*a* of the body 10A, which is the mount surface.

Accordingly, in the laminated coil component 1, the laminating direction in which the insulating layers are laminated and the direction of the coil axis C of the coil 30A are parallel with the first main surface 12*a* of the body 10A, which is the mount surface, along the same length direction L.

Although an aspect in which the laminating direction in which the insulating layers are laminated and the direction of the coil axis C of the coil 30A are parallel with the first main surface 12*a* of the body 10A, which is the mount surface, along the same length direction L has been illustrated in the laminated coil component 1, the laminating direction in which the insulating layers are laminated and the direction of the coil axis of the coil may be orthogonal to the first main surface of the body, which is the mount surface.

In the laminated coil component 1, the plurality of coil conductors laminated in the length direction L include a first laminated part Ea1.

The first laminated part Ea1 includes the three adjacent coil conductors Q1, Q2, and Q3. The coil conductor Q1 is an outermost coil conductor located at an outermost position in the length direction L among the plurality of coil conductors laminated in the length direction L.

The first laminated part Ea1 has a first parallel section Ma1 in which all of the coil conductors that constitute the first laminated part Ea1, specifically the coil conductor Q1, the coil conductor Q2, and the coil conductor Q3 overlap each other when viewed in the length direction L.

The coil conductors in the first parallel section Ma1 are connected in parallel by the via conductor Sa2, the via conductor Sb2, the via conductor Sa3, and the via conductor Sb3. That is, the coil conductor Q1, the coil conductor Q2, and the coil conductor Q3 are connected in parallel in the first parallel section Ma1.

In a section other than the first parallel section Ma1, not all of the coil conductor Q1, the coil conductor Q2, and the coil conductor Q3 overlap each other when viewed in the length direction L.

In the laminated coil component according to the present disclosure, a length of all of the coil conductors that constitute the first laminated part may be a length of ¾ of a turn of the coil.

In the laminated coil component 1, for example, a length of all of the coil conductors that constitute the first laminated part Ea1, specifically the coil conductor Q1, the coil conductor Q2, and the coil conductor Q3 is a length of ¾ of a turn of the coil 30A.

In the specification, a length of a coil conductor means a length in a direction in which the coil conductor extends on a plane orthogonal to the laminating direction (the length direction L in FIGS. 2 and 3) when viewed in the laminating direction.

In the laminated coil component according to the present disclosure, the plurality of coil conductors laminated in the laminating direction preferably further include a second laminated part that includes a same number of adjacent coil conductors as the first laminated part. The second laminated part preferably has second parallel sections in which all of the coil conductors that constitute the second laminated part overlap each other when viewed in the laminating direction. The second parallel sections are preferably connected in parallel by the via conductors, and the first parallel sections and the second parallel sections preferably overlap each other when viewed in the laminating direction.

In the laminated coil component 1, the plurality of coil conductors laminated in the length direction L further include a second laminated part Fal in addition to the first laminated part Ea1.

The second laminated part Fal includes a same number of coil conductors as the first laminated part Ea1, specifically the three adjacent coil conductors Q5, Q6, and Q7.

The second laminated part Fal has second parallel sections Nal in which all of the coil conductors that constitute the second laminated part Fal, specifically the coil conductor Q5, the coil conductor Q6, and the coil conductor Q7 overlap each other when viewed in the length direction L.

The second parallel sections Nal are connected in parallel by the via conductor Sa6, the via conductor Sb6, the via conductor Sa1, and the via conductor Sb7. That is, the coil conductor Q5, the coil conductor Q6, and the coil conductor Q7 are connected in parallel in the second parallel sections Nal.

In a section other than the second parallel sections Nal, not all of the coil conductor Q5, the coil conductor Q6, and the coil conductor Q7 overlap each other when viewed in the length direction L.

The first parallel section Ma1 and the second parallel sections Nal overlap each other when viewed in the length direction L.

In the laminated coil component according to the present disclosure, a length of all of the coil conductors that constitute the second laminated part may be a length of ¾ of a turn of the coil.

In the laminated coil component 1, for example, a length of all of the coil conductors that constitute the second laminated part Fal, specifically the coil conductor Q5, the coil conductor Q6, and the coil conductor Q7 is a length of ¾ of a turn of the coil 30A.

Although an aspect in which the first laminated part includes the coil conductor Q1, which is an outermost coil conductor located on the first end surface 11*a* side of the body 10A, has been illustrated above, the first laminated part may include the coil conductor Q14, which is an outermost coil conductor located on the second end surface 11*b* side of the body 10A.

In the laminated coil component 1, the plurality of coil conductor laminated in the length direction L include a first laminated part Eb 1.

The first laminated part Ebl includes the three adjacent coil conductors Q12, Q13, and Q14. The coil conductor Q14 is an outermost coil conductor located at an outermost position in the length direction L among the plurality of coil conductors laminated in the length direction L, as with the coil conductor Q1.

The first laminated part Ebl has a first parallel section Mb1 in which all of the coil conductors that constitute the first laminated part Ebl, specifically the coil conductor Q12, the coil conductor Q13, and the coil conductor Q14 overlap each other when viewed in the length direction L.

The coil conductors in the first parallel section Mb1 are connected in parallel by the via conductor Sa13, the via conductor Sd13, the via conductor Sa14, and the via conductor Sd14. Specifically, the coil conductor Q12, the coil conductor Q13, and the coil conductor Q14 are connected in parallel in the first parallel section Mb1.

In a section other than the first parallel section Mb1, not all of the coil conductor Q12, the coil conductor Q13, and the coil conductor Q14 overlap each other when viewed in the length direction L.

A length of all of the coil conductors that constitute the first laminated part Eb 1, specifically the coil conductor Q12, the coil conductor Q13, and the coil conductor Q14 is a length of ¾ of a turn of the coil 30A.

In the laminated coil component 1, the plurality of coil conductors laminated in the length direction L further include a second laminated part Fb 1 in addition to the first laminated part Eb 1.

The second laminated part Fbl includes a same number of coil conductors as the first laminated part Ebl, specifically the three adjacent coil conductors Q8, Q9, and Q10.

The second laminated part Fb 1 has a second parallel section Nb 1 in which all of the coil conductors that constitute the second laminated part Fb 1, specifically the coil conductor Q8, the coil conductor Q9, and the coil conductor Q10 overlap each other when viewed in the length direction L.

The coil conductors in the second parallel section Nb 1 are connected in parallel by the via conductor Sa9, the via conductor Sd9, the via conductor Sa10, and the via conductor Sd10. Specifically, the coil conductor Q8, the coil conductor Q9, and the coil conductor Q10 are connected in parallel in the second parallel section Nbl.

In a section other than the second parallel section Nb 1, not all of the coil conductor Q8, the coil conductor Q9, and the coil conductor Q10 overlap each other when viewed in the length direction L.

The first parallel section Mb1 and the second parallel section Nbl overlap when viewed in the length direction L.

A length of all of the coil conductors that constitute the second laminated part Fb 1, specifically the coil conductor Q8, the coil conductor Q9, and the coil conductor Q10 is a length of ¾ of a turn of the coil 30A.

Although the first laminated part Ea1, the first laminated part Eb 1, the second laminated part Fal, and the second laminated part Fbl are illustrated above as laminated parts each including three adjacent coil conductors in the laminated coil component 1, the same applies to a laminated part constituted by a different combination of three adjacent coil conductors. That is, in the laminated coil component 1, three adjacent coil conductors are connected in parallel in parallel sections in which these coil conductors overlap each other when viewed in the length direction L.

In the laminated coil component 1, three adjacent coil conductors are connected in parallel in parallel sections, and therefore a cross-sectional area of the coil 30A orthogonal to a direction along a current path of the coil 30A, that is, a direction in which the coil conductors extend increase accordingly. Therefore, in the laminated coil component 1, direct-current resistance (Rdc) of the coil 30A is low, and a large current can be passed through the coil 30A.

The body 10A further includes an insulating layer Px.

The insulating layer Px is laminated on the first end surface Ila side of the insulating layer P1, that is, on a side of the insulating layer P1 opposite to the insulating layer P2.

A lead-out land portion Rbx is provided on a main surface of the insulating layer Px. The lead-out land portion Rbx is connected to a lead-out via conductor Sbx that penetrates the insulating layer Px in the length direction L. The lead-out land portion Rbx is also connected to a lead-out via conductor Sb1 that penetrates the insulating layer P1 in the length direction L in addition to the lead-out via conductor Sbx. This forms a first lead-out conductor 41*a* including the lead-out land portion Rbx, the lead-out via conductor Sbx, and the lead-out via conductor Sb1.

The lead-out via conductor Sb1 is also connected to the land portion Rb1 in addition to the lead-out land portion Rbx. That is, the coil conductor Q1, which is an outermost coil conductor, is connected to the first lead-out conductor 41*a* at the land portion Rb1 located at one end of the first parallel section Ma1. In this way, the first lead-out conductor 41*a* is connected to the coil 30A.

Figure 4:
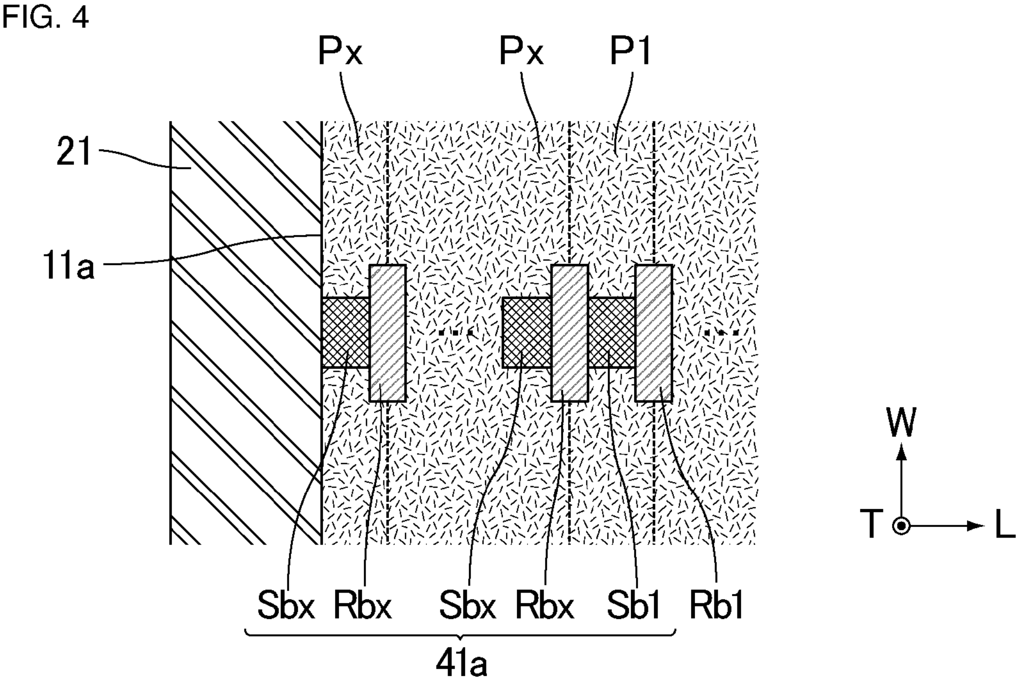
FIG. 4 is an enlarged cross-sectional schematic view illustrating an example of a vicinity of a first end surface of a body viewed in a height direction in the laminated coil component illustrated in FIG. 1.

FIG. 4 is an enlarged cross-sectional schematic view illustrating an example of a vicinity of the first end surface of the body viewed in the height direction in the laminated coil component illustrated in FIG. 1.

As illustrated in FIG. 4, since the insulating layer Px is laminated on a side of the insulating layer P1 opposite to the insulating layer P2, the first lead-out conductor 41*a* is exposed from the first end surface 11*a* of the body 10A. An exposed part of the first lead-out conductor 41*a* is connected to the first outer electrode 21 provided on the first end surface 11*a* of the body 10A.

Accordingly, the coil 30A and the first outer electrode 21 are electrically connected by the first lead-out conductor 41*a*. That is, the coil conductor Q1, which is an outermost coil conductor, is electrically connected to the first outer electrode 21 by the first lead-out conductor 41*a* at the land portion Rb1 located at the one end of the first parallel section Ma1.

Although boundaries between insulating layers are illustrated in FIG. 4 for convenience of description, the boundaries do not clearly appear actually.

On the main surface of the insulating layer Px, a lead-out land portion Rax is provided at a position apart from the lead-out land portion Rbx. The lead-out land portion Rax is connected to a lead-out via conductor Sax that penetrates the insulating layer Px in the length direction L. The lead-out land portion Rax is also connected to a lead-out via conductor Sa1 that penetrates the insulating layer P1 in the length direction L in addition to the lead-out via conductor Sax. This forms a second lead-out conductor 42*a* including the lead-out land portion Rax, the lead-out via conductor Sax, and the lead-out via conductor Sa1.

The lead-out via conductor Sa1 is also connected to the bent portion Ua1 in addition to the lead-out land portion Rax. That is, the coil conductor Q1, which is an outermost coil conductor, is connected to the second lead-out conductor 42*a* at the bent portion Ua1 located at the other end of the first parallel section Ma1. In this way, the second lead-out conductor 42*a* is connected to the coil 30A.

Since the insulating layer Px is laminated on a side of the insulating layer P1 opposite to the insulating layer P2, the second lead-out conductor 42*a* is exposed from the first end surface 11*a* of the body 10A. An exposed part of the second lead-out conductor 42*a* is connected to the first outer electrode 21 provided on the first end surface 11*a* of the body 10A. A cross-sectional view illustrating a manner of connection between the second lead-out conductor 42*a* and the first outer electrode 21 is similar to FIG. 4, which is a cross-sectional view illustrating a manner of connection between the first lead-out conductor 41*a* and the first outer electrode 21.

Accordingly, the coil 30A and the first outer electrode 21 are electrically connected by the second lead-out conductor 42*a*. That is, the coil conductor Q1, which is an outermost coil conductor, is electrically connected to the first outer electrode 21 by the second lead-out conductor 42*a* at the bent portion Ua1 located at the other end of the first parallel section Ma1.

As described above, the coil 30A is electrically connected to the same first outer electrode 21 by the first lead-out conductor 41*a* and the second lead-out conductor 42*a*. Specifically, the coil conductor Q1, which is an outermost coil conductor, is electrically connected to the same first outer electrode 21 by the first lead-out conductor 41*a* at the land portion Rb1 located at the one end of the first parallel section Ma1 and by the second lead-out conductor 42*a* at the bent portion Ua1 located at the other end of the first parallel section Ma1.

In the laminated coil component 1, since the coil conductor Q1, which is an outermost coil conductor, is electrically connected to the same first outer electrode 21 by the first lead-out conductor 41*a* at the one end of the first parallel section Ma1 and by the second lead-out conductor 42*a* at the other end of the first parallel section Ma1, two current paths, specifically the first lead-out conductor 41*a* and the second lead-out conductor 42*a* can be provided between the coil 30A and the first outer electrode 21. Accordingly, in the laminated coil component 1, a current density per lead-out conductor can be lowered. Therefore, in the laminated coil component 1, for example, even in a case where a large current is passed between the coil 30A and the first outer electrode 21, heat generation and electrochemical migration in a lead-out conductor can be made less likely to occur than in a case where the coil 30A and the first outer electrode 21 are electrically connected by only a single lead-out conductor. In a case where the coil 30A and the first outer electrode 21 are electrically connected by only a single lead-out conductor, the laminated coil component may undesirably become unable to function upon occurrence of disconnection due to heat generation and electrochemical migration in the lead-out conductor. On the other hand, in the laminated coil component 1, even in a case where a large current is passed between the coil 30A and the first outer electrode 21, heat generation and electrochemical migration in a lead-out conductor can be made less likely to occur, and therefore disconnection of the lead-out conductor can be made less likely to occur. Furthermore, in the laminated coil component 1, even if disconnection occurs in one of the first lead-out conductor 41*a* and the second lead-out conductor 42*a*, the function of the laminated coil component can be maintained by the other one of the first lead-out conductor 41*a* and the second lead-out conductor 42*a*.

The number of insulating layers Px may be one or may be more than one.

In a case where the number of insulating layers Px is more than one, the first lead-out conductor 41*a* is configured such that the lead-out land portion Rbx and the lead-out via conductor Sbx are alternately connected and the lead-out via conductor Sb1 is further connected.

In a case where the number of insulating layers Px is more than one, the second lead-out conductor 42*a* is configured such that the lead-out land portion Rax and the lead-out via conductor Sax are alternately connected and the lead-out via conductor Sa1 is further connected.

The body 10A further includes an insulating layer Py.

The insulating layer Py is laminated on the second end surface 1 lb side of the insulating layer P14, that is, on a side of the insulating layer P14 opposite to the insulating layer P13.

A lead-out land portion Rdy is provided on a main surface of the insulating layer Py. The lead-out land portion Rdy is connected to a lead-out via conductor Sdy that penetrates the insulating layer Py in the length direction L. This forms a first lead-out conductor 41*b* including the lead-out land portion Rdy and the lead-out via conductor Sdy.

The lead-out via conductor Sdy is also connected to the land portion Rd14 in addition to the lead-out land portion Rdy. That is, the coil conductor Q14, which is an outermost coil conductor, is connected to the first lead-out conductor 41*b* at the land portion Rd14 located at one end of the first parallel section Mb1. In this way, the first lead-out conductor 41*b* is connected to the coil 30A.

Figure 5:
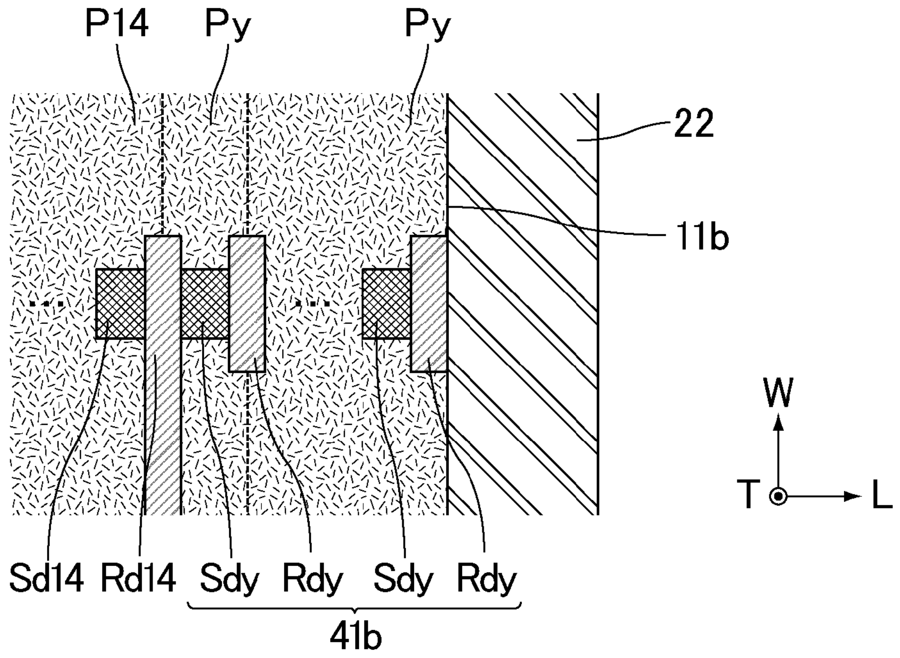
FIG. 5 is an enlarged cross-sectional schematic view illustrating an example of a vicinity of a second end surface of the body viewed in the height direction in the laminated coil component illustrated in FIG. 1.

FIG. 5 is an enlarged cross-sectional schematic view illustrating an example of a vicinity of the second end surface of the body viewed in the height direction in the laminated coil component illustrated in FIG. 1.

As illustrated in FIG. 5, since the insulating layer Py is laminated on a side of the insulating layer P14 opposite to the insulating layer P13, the first lead-out conductor 41*b* is exposed from the second end surface 11*b* of the body 10A. An exposed part of the first lead-out conductor 41*b* is connected to the second outer electrode 22 provided on the second end surface 11*b* of the body 10A.

Accordingly, the coil 30A and the second outer electrode 22 are electrically connected by the first lead-out conductor 41*b*. That is, the coil conductor Q14, which is an outermost coil conductor, is electrically connected to the second outer electrode 22 by the first lead-out conductor 41*b* at the land portion Rd14 located at the one end of the first parallel section Mb1.

Although boundaries between insulating layers are illustrated in FIG. 5 for convenience of description, the boundaries do not clearly appear actually.

On the main surface of the insulating layer Py, a lead-out land portion Ray is provided at a position apart from the lead-out land portion Rdy. The lead-out land portion Ray is connected to a lead-out via conductor Say that penetrates the insulating layer Py in the length direction L. This forms a second lead-out conductor 42*b* including the lead-out land portion Ray and the lead-out via conductor Say.

The lead-out via conductor Say is also connected to the bent portion Ua14 in addition to the lead-out land portion Ray. That is, the coil conductor Q14, which is an outermost coil conductor, is connected to the second lead-out conductor 42*b* at the bent portion Ua14 located at the other end of the first parallel section Mb1. In this way, the second lead-out conductor 42*b* is connected to the coil 30A.

Since the insulating layer Py is laminated on a side of the insulating layer P14 opposite to the insulating layer P13, the second lead-out conductor 42*b* is exposed from the second end surface 11*b* of the body 10A. An exposed part of the second lead-out conductor 42*b* is connected to the second outer electrode 22 provided on the second end surface 11*b* of the body 10A. A cross-sectional view illustrating a manner of connection between the second lead-out conductor 42*b* and the second outer electrode 22 is similar to FIG. 5, which is a cross-sectional view illustrating a manner of connection between the first lead-out conductor 41*b* and the second outer electrode 22.

Accordingly, the coil 30A and the second outer electrode 22 are electrically connected by the second lead-out conductor 42*b*. That is, the coil conductor Q14, which is an outermost coil conductor, is electrically connected to the second outer electrode 22 by the second lead-out conductor 42*b* at the bent portion Ua14 located at the other end of the first parallel section Mb1.

As described above, the coil 30A is electrically connected to the same second outer electrode 22 by the first lead-out conductor 41*b* and the second lead-out conductor 42*b*. That is, the coil conductor Q14, which is an outermost coil conductor, is electrically connected to the same second outer electrode 22 by the first lead-out conductor 41*b* at the land portion Rd14 located at the one end of the first parallel section Mb1 and by the second lead-out conductor 42*b* at the bent portion Ua14 located at the other end of the first parallel section Mb1.

In the laminated coil component 1, since the coil conductor Q14, which is an outermost coil conductor, is electrically connected to the same second outer electrode 22 by the first lead-out conductor 41*b* at the one end of the first parallel section Mb1 and by the second lead-out conductor 42*b* at the other end of the first parallel section Mb1, two current paths, specifically the first lead-out conductor 41*b* and the second lead-out conductor 42*b* can be provided between the coil 30A and the second outer electrode 22. Accordingly, in the laminated coil component 1, a current density per lead-out conductor can be lowered. Therefore, in the laminated coil component 1, for example, even in a case where a large current is passed between the coil 30A and the second outer electrode 22, heat generation and electrochemical migration in a lead-out conductor can be made less likely to occur than in a case where the coil 30A and the second outer electrode 22 are electrically connected by only a single lead-out conductor. In a case where the coil 30A and the second outer electrode 22 are electrically connected by only a single lead-out conductor, the laminated coil component may undesirably become unable to function upon occurrence of disconnection due to heat generation and electrochemical migration in the lead-out conductor. On the other hand, in the laminated coil component 1, even in a case where a large current is passed between the coil 30A and the second outer electrode 22, heat generation and electrochemical migration in a lead-out conductor can be made less likely to occur, and therefore disconnection of the lead-out conductor can be made less likely to occur. Furthermore, in the laminated coil component 1, even if disconnection occurs in one of the first lead-out conductor 41*b* and the second lead-out conductor 42*b*, the function of the laminated coil component can be maintained by the other one of the first lead-out conductor 41*b* and the second lead-out conductor 42*b*.

The number of insulating layers Py may be one or may be more than one.

In a case where the number of insulating layers Py is more than one, the first lead-out conductor 41*b* is configured such that the lead-out land portion Rdy and the lead-out via conductor Sdy are alternately connected.

In a case where the number of insulating layers Py is more than one, the second lead-out conductor 42*b* is configured such that the lead-out land portion Ray and the lead-out via conductor Say are alternately connected.

The number of insulating layers Px and the number of insulating layers Py may be identical to each other or may be different from each other.

Examples of materials of which each coil conductor (including a land portion), each via conductor, and each lead-out via conductor are made include Ag, Au, Cu, Pd, Ni, Al, and an alloy containing at least one kind of metal selected from among these metals.

When viewed in the length direction L, each coil conductor may have a shape constituted by straight lines as illustrated in FIGS. 2 and 3, may have a shape constituted by a curve, or may have a shape constituted by a straight line and a curve.

When viewed in the length direction L, each land portion may have a circular shape or may have a polygonal shape.

When viewed in the length direction L, each via conductor may have a circular shape or may have a polygonal shape.

When viewed in the length direction L, each lead-out via conductor may have a circular shape or may have a polygonal shape.

Each coil conductor and each lead-out conductor need not necessarily have a land portion independently.

In the laminated coil component according to the present disclosure, a region where the first lead-out conductor and the outermost coil conductor overlap each other preferably overlaps a region where four adjacent coil conductors including the outermost coil conductor overlap each other with the via conductors interposed therebetween when viewed in the laminating direction. Also, a region where the second lead-out conductor and the outermost coil conductor overlap each other preferably overlaps a region where three adjacent coil conductors including the outermost coil conductor overlap each other with the via conductors interposed therebetween when viewed in the laminating direction.

The coil conductor Q1, which is an outermost coil conductor, is connected to the first lead-out conductor 41*a* at the land portion Rb1. That is, the land portion Rb1 overlaps the first lead-out conductor 41*a* when viewed in the length direction L.

Meanwhile, four adjacent coil conductors including the coil conductor Q1, which is an outermost coil conductor, specifically the coil conductor Q1, the coil conductor Q2, the coil conductor Q3, and the coil conductor Q4 are electrically connected by via conductors as follows.

The coil conductor Q1 and the coil conductor Q2 are electrically connected by the via conductor Sb2 at the land portion Rb1 and the bent portion Ub2. That is, the land portion Rb1 and the bent portion Ub2 overlap each other with the via conductor Sb2 interposed therebetween when viewed in the length direction L.

The coil conductor Q2 and the coil conductor Q3 are electrically connected by the via conductor Sb3 at the bent portion Ub2 and the bent portion Ub3. That is, the bent portion Ub2 and the bent portion Ub3 overlap each other with the via conductor Sb3 interposed therebetween when viewed in the length direction L.

The coil conductor Q3 and the coil conductor Q4 are electrically connected by the via conductor Sb4 at the bent portion Ub3 and the land portion Rb4. That is, the bent portion Ub3 and the land portion Rb4 overlap each other with the via conductor Sb4 interposed therebetween when viewed in the length direction L.

Accordingly, in the laminated coil component 1, the first lead-out conductor 41*a*, the land portion Rb1, the bent portion Ub2, the bent portion Ub3, and the land portion Rb4 overlap each other when viewed in the length direction L. In this way, in the laminated coil component 1, a region where the first lead-out conductor 41*a* and the coil conductor Q1, which is an outermost coil conductor, overlap each other overlaps a region where the four adjacent coil conductors Q1, Q2, Q3, and Q4 including the coil conductor Q1, which is an outermost coil conductor, overlap each other with the via conductor Sb2, the via conductor Sb3, and the via conductor Sb4 interposed therebetween when viewed in the length direction L. This can shorten a current path between the region where the coil conductor Q1, the coil conductor Q2, the coil conductor Q3, and the coil conductor Q4 overlap each other with the via conductor Sb2, the via conductor Sb3, and the via conductor Sb4 interposed therebetween and the first lead-out conductor 41*a*, thereby lowering direct-current resistance of the current path.

In the region where the coil conductor Q1, the coil conductor Q2, the coil conductor Q3, and the coil conductor Q4 overlap each other with the via conductor Sb2, the via conductor Sb3, and the via conductor Sb4 interposed therebetween, a current density tends to become high as compared with a region described later where the coil conductor Q1, the coil conductor Q2, and the coil conductor Q3 overlap each other with the via conductor Sa2 and the via conductor Sa3 interposed therebetween. Accordingly, a current density of the first lead-out conductor 41*a* is kept from becoming high by decreasing direct-current resistance of the current path between the region where the coil conductor Q1, the coil conductor Q2, the coil conductor Q3, and the coil conductor Q4 overlap each other with the via conductor Sb2, the via conductor Sb3, and the via conductor Sb4 interposed therebetween and the first lead-out conductor 41*a* as described above. Combined with the configuration in which two current paths, specifically the first lead-out conductor 41*a* and the second lead-out conductor 42*a* are provided between the coil 30A and the first outer electrode 21, this makes heat generation and electrochemical migration in the first lead-out conductor 41*a* less likely to occur in the laminated coil component 1. As a result, disconnection of the first lead-out conductor 41*a* is less likely to occur in the laminated coil component 1.

The coil conductor Q1, which is an outermost coil conductor, is connected to the second lead-out conductor 42*a* at the bent portion Ua1. That is, the bent portion Ua1 overlaps the second lead-out conductor 42*a* when viewed in the length direction L.

Meanwhile, three adjacent coil conductors including the coil conductor Q1, which is an outermost coil conductor, specifically the coil conductor Q1, the coil conductor Q2, and the coil conductor Q3 are electrically connected by via conductors as follows.

The coil conductor Q1 and the coil conductor Q2 are electrically connected by the via conductor Sa2 at the bent portion Ua1 and the bent portion Ua2. That is, the bent portion Ua1 and the bent portion Ua2 overlap each other with the via conductor Sa2 interposed therebetween when viewed in the length direction L.

The coil conductor Q2 and the coil conductor Q3 are electrically connected by the via conductor Sa3 at the bent portion Ua2 and the land portion Ra3. That is, the bent portion Ua2 and the land portion Ra3 overlap each other with the via conductor Sa3 interposed therebetween when viewed in the length direction L.

Accordingly, in the laminated coil component 1, the second lead-out conductor 42*a*, the bent portion Ua1, the bent portion Ua2, and the land portion Ra3 overlap each other when viewed in the length direction L. In this way, in the laminated coil component 1, a region where the second lead-out conductor 42*a* and the coil conductor Q1, which is an outermost coil conductor, overlap each other overlaps a region where the three adjacent coil conductors Q1, Q2, and Q3 including the coil conductor Q1, which is an outermost coil conductor, overlap each other with the via conductor Sa2 and the via conductor Sa3 interposed therebetween when viewed in the length direction L. This can shorten a current path between the region where the coil conductor Q1, the coil conductor Q2, and the coil conductor Q3 overlap each other with the via conductor Sa2 and the via conductor Sa3 interposed therebetween and the second lead-out conductor 42*a*, thereby lowering direct-current resistance of the current path.

Although an aspect in which the outermost coil conductor is the coil conductor Q1 has been illustrated above, the same applies to an aspect in which the outermost coil conductor is the coil conductor Q14.

The coil conductor Q14, which is an outermost coil conductor, is connected to the first lead-out conductor 41*b* at the land portion Rd14. That is, the land portion Rd14 overlaps the first lead-out conductor 41*b* when viewed in the length direction L.

Meanwhile, four adjacent coil conductors including the coil conductor Q14, which is an outermost coil conductor, specifically the coil conductor Q11, the coil conductor Q12, the coil conductor Q13, and the coil conductor Q14 are electrically connected by via conductors as follows.

The coil conductor Q11 and the coil conductor Q12 are electrically connected by the via conductor Sd12 at the land portion Rd11 and the bent portion Ud12. That is, the land portion Rd11 and the bent portion Ud12 overlap each other with the via conductor Sd12 interposed therebetween when viewed in the length direction L.

The coil conductor Q12 and the coil conductor Q13 are electrically connected by the via conductor Sd13 at the bent portion Ud12 and the bent portion Ud13. That is, the bent portion Ud12 and the bent portion Ud13 overlap each other with the via conductor Sd13 interposed therebetween when viewed in the length direction L.

The coil conductor Q13 and the coil conductor Q14 are electrically connected by the via conductor Sd14 at the bent portion Ud13 and the land portion Rd14. That is, the bent portion Ud13 and the land portion Rd14 overlap each other with the via conductor Sd14 interposed therebetween when viewed in the length direction L.

Accordingly, in the laminated coil component 1, the first lead-out conductor 41*b*, the land portion Rd14, the bent portion Ud13, the bent portion Ud12, and the land portion Rd11 overlap each other when viewed in the length direction L. In this way, in the laminated coil component 1, a region where the first lead-out conductor 41*b* and the coil conductor Q14, which is an outermost coil conductor, overlap each other overlaps a region where the four adjacent coil conductors Q11, Q12, Q13, and Q14 including the coil conductor Q14, which is an outermost coil conductor, overlap each other with the via conductor Sd12, the via conductor Sd13, and the via conductor Sd14 interposed therebetween when viewed in the length direction L. This can shorten a current path between the region where the coil conductor Q11, the coil conductor Q12, the coil conductor Q13, and the coil conductor Q14 overlap each other with the via conductor Sd12, the via conductor Sd13, and the via conductor Sd14 interposed therebetween and the first lead-out conductor 41*b*, thereby lowering direct-current resistance of the current path.

In the region where the coil conductor Q11, the coil conductor Q12, the coil conductor Q13, and the coil conductor Q14 overlap each other with the via conductor Sd12, the via conductor Sd13, and the via conductor Sd14 interposed therebetween, a current density tends to become high as compared with a region described later where the coil conductor Q12, the coil conductor Q13, and the coil conductor Q14 overlap each other with the via conductor Sa13 and the via conductor Sa14 interposed therebetween. Accordingly, a current density of the first lead-out conductor

41*b* is kept from becoming high by lowering direct-current resistance of a current path between the region where the coil conductor Q11, the coil conductor Q12, the coil conductor Q13, and the coil conductor Q14 overlap each other with the via conductor Sd12, the via conductor Sd13, and the via conductor Sd14 interposed therebetween and the first lead-out conductor 41*b* as described above. Combined with the configuration in which two current paths, specifically the first lead-out conductor 41*b* and the second lead-out conductor 42*b* are provided between the coil 30A and the second outer electrode 22, this makes heat generation and electrochemical migration in the first lead-out conductor 41*b* less likely to occur in the laminated coil component 1. As a result, in the laminated coil component 1, disconnection of the first lead-out conductor 41*b* is less likely to occur.

The coil conductor Q14, which is an outermost coil conductor, is connected to the second lead-out conductor 42*b* at the bent portion Ua14. That is, the bent portion Ua14 overlaps the second lead-out conductor 42*b* when viewed in the length direction L.

Meanwhile, three adjacent coil conductors including the coil conductor Q14, which is an outermost coil conductor, specifically the coil conductor Q12, the coil conductor Q13, and the coil conductor Q14 are electrically connected by via conductors as follows.

The coil conductor Q12 and the coil conductor Q13 are electrically connected by the via conductor Sa13 at the land portion Ra12 and the bent portion Ua13. That is, the land portion Ra12 and the bent portion Ua13 overlap each other with the via conductor Sa13 interposed therebetween when viewed in the length direction L.

The coil conductor Q13 and the coil conductor Q14 are electrically connected by the via conductor Sa14 at the bent portion Ua13 and the bent portion Ua14. That is, the bent portion Ua13 and the bent portion Ua14 overlap each other with the via conductor Sa14 interposed therebetween when viewed in the length direction L.

Accordingly, in the laminated coil component 1, the second lead-out conductor 42*b*, the bent portion Ua14, the bent portion Ua13, and the land portion Ra12 overlap each other when viewed in the length direction L. In this way, in the laminated coil component 1, a region where the second lead-out conductor 42*b* and the coil conductor Q14, which is an outermost coil conductor, overlap each other overlaps a region where the three adjacent coil conductors Q12, Q13, and Q14 including the coil conductor Q14, which is an outermost coil conductor, overlap each other with the via conductor Sa13 and the via conductor Sa14 interposed therebetween when viewed in the length direction L. This can shorten a current path between the region where the coil conductor Q12, the coil conductor Q13, and the coil conductor Q14 overlap each other with the via conductor Sa13 and the via conductor Sa14 interposed therebetween and the second lead-out conductor 42*b*, thereby lowering direct-current resistance of the current path.

The laminated coil component 1 can be, for example, produced by the following method.

Process for Producing Magnetic Material

First, $Fe_2O_3$, ZnO, CuO, and NiO are weighed so that a predetermined ratio is obtained.

Next, the weighed materials, pure water, and others are mixed in a ball mill together with a PSZ medium and is then crushed. A mixing and crushing period is, for example, four hours or more and eight hours or less (i.e., from four hours to eight hours).

A crushed material thus obtained is dried and is then pre-fired. A pre-firing temperature is, for example, 700° C. or more and 800° C. or less (i.e., from 700° C. to 800° C.). A pre-firing period is, for example, two hours or more and five hours or less (i.e., from two hours to five hours).

In this way, a powdered magnetic material, more specifically a powdered magnetic ferrite material is produced.

The ferrite material is preferably Ni—Cu—Zn ferrite material.

The Ni—Cu—Zn ferrite material preferably contains 40 mol % or more and 49.5 mol % or less (i.e., from 40 mol % to 49.5 mol %) of Fe in terms of $Fe_2O_3$, 2 mol % or more and 35 mol % or less (i.e., from 2 mol % to 35 mol %) of Zn in terms of ZnO, and 6 mol % or more and 13 mol % or less (i.e., from 6 mol % to 13 mol %) of Cu in terms of CuO, and 10 mol % or more and 45 mol % or less (i.e., from 10 mol % to 45 mol %) of Ni in terms of NiO when a whole amount is 100 mol %.

The Ni—Cu—Zn ferrite material may further contain an additive such as Co, Bi, Sn, or Mn.

The Ni—Cu—Zn ferrite material may further contain unavoidable impurities.

Process for Producing Green Sheet

First, the magnetic material, an organic binder such as a polyvinyl butyral resin, an organic solvent such as ethanol or toluene, a plasticizer, and others are mixed in a ball mill together with a PSZ medium and is then crushed to produce a slurry.

Next, the slurry is formed into a sheet shape having a predetermined thickness by a method such as a doctor blade method, and then the sheet is punched out in a predetermined shape to produce a green sheet. A thickness of the green sheet is, for example, 20 um or more and 30 um or less (i.e., from 20 um to 30 μm). A shape of the green sheet is, for example, rectangular.

Instead of the magnetic material, the green sheet may be made of a non-magnetic material such as a borosilicate glass material or may be made of a mixture of a magnetic material and a non-magnetic material.

Process for Forming Conductor Patterns

First, via holes are formed by irradiating predetermined positions of the green sheet with laser.

Next, conductive paste such as Ag paste is applied to a surface of the green sheet by a method such as a screen printing method while filling the via holes. This forms conductor patterns for via conductors in the via holes of the green sheet and forms a conductor pattern for coil conductor connected to the conductor patterns for via conductors on the surface of the green sheet. In this way, a coil sheet, which is the green sheet in which the conductor pattern for coil conductor and the conductor patterns for via conductors are formed, is produced. Plural such coil sheets are produced, each of which has a conductor pattern for coil conductor corresponding to the coil conductor illustrated in FIGS. 2 and 3 and conductor patterns for via conductors corresponding to the via conductors (including the lead-out via conductor Sa1 and the lead-out via conductor Sb1 illustrated in FIGS. 2 and 3) connected to the coil conductor illustrated in FIGS. 2 and 3.

Furthermore, conductive paste such as Ag paste is applied to the surface of the green sheet by a method such as a screen printing method while filling the via holes. This forms conductor patterns for via conductors in the via holes of the green sheet and forms conductor patterns for land portions connected to the conductor patterns for via conductors on the surface of the green sheet. In this way, a via sheet, which is the green sheet in which the conductor patterns for land portions and the conductor patterns for via conductors are formed, is produced separately from the coil sheet. Plural such via sheets are produced, each of which has conductor patterns for land portions corresponding to lead-out land portions constituting the lead-out conductors illustrated in FIGS. 2 and 3 and conductor patterns for via conductors corresponding to lead-out via conductors (excluding the lead-out via conductor Sa1 and the lead-out via conductor Sb1 illustrated in FIGS. 2 and 3) connected to the lead-out land portions illustrated in FIGS. 2 and 3.

Process for Producing Multilayer Body Block

The coil sheets and the via sheets are laminated in the laminating direction (the length direction L in FIGS. 2 and 3) in an order corresponding to the order of FIGS. 2 and 3 and are then thermocompression-bonded to produce a multilayer body block.

Process for Producing Body and Coil

First, the multilayer body block is cut into chips each having a predetermined size by a dicer or the like.

Next, the chips are fired. A firing temperature is, for example, 900° C. or more and 920° C. or less (i.e., from 900° C. to 920° C.). A firing period is, for example, two hours or more and four hours or less (i.e., from two hours to four hours).

When the chips are fired, the green sheets of the coil sheets and the via sheets become insulating layers. As a result, a body in which a plurality of insulating layers are laminated in the laminating direction (the length direction L in FIGS. 2 and 3) is produced.

When the chips are fired, the conductor patterns for coil conductors and the conductor patterns for via conductors of the coil sheets become coil conductors and via conductors (including the lead-out via conductor Sa1 and the lead-out via conductor Sb1 illustrated in FIGS. 2 and 3). As a result, a coil configured such that the plurality of coil conductors laminated in the laminating direction (the length direction L in FIGS. 2 and 3) are electrically connected by the via conductors is produced.

In this way, a body and a coil provided in the body are produced.

Meanwhile, when the chips are fired, the conductor patterns for land portions and the conductor patterns for via conductors of the via sheets become lead-out land portions and lead-out via conductors. As a result, a first lead-out conductor and a second lead-out conductor in each of which a lead-out land portion and a lead-out via conductor laminated in the laminating direction (the length direction L in FIGS. 2 and 3) are alternately connected are produced. The first lead-out conductor and the second lead-out conductor located on a first end surface side of the body are exposed from the first end surface of the body. The first lead-out conductor and the second lead-out conductor located on a second end surface side of the body are exposed from the second end surface of the body.

Corners and ridge portions of the body may be rounded, for example, by barrel polishing.

Process for Forming Outer Electrodes

First, a first coating film connected to the first lead-out conductor and the second lead-out conductor exposed from the first end surface of the body are formed so as to extend from the first end surface of the body over portions of a first main surface, a second main surface, a first side surface, and a second side surface by applying conductive paste such as paste containing Ag and glass frit.

Furthermore, a second coating film connected to a third lead-out conductor and a fourth lead-out conductor exposed from the second end surface of the body is formed so as to extend from the second end surface of the body over portions of the first main surface, the second main surface, the first side surface, and the second side surface by applying conductive paste such as paste containing Ag and glass frit.

In this way, the first coating film and the second coating film are formed at separate positions on the surfaces of the body.

When the first coating film and the second coating film are formed, the first coating film and the second coating film may be formed at different timings or may be formed at an identical timing.

In a case where the first coating film and the second coating film are formed at different timings, the first coating film and the second coating film may be formed in this order or may be formed in an opposite order.

Next, a first base electrode that extends from the first end surface of the body over portions of the first main surface, the second main surface, the first side surface, and the second side surface and is connected to the first lead-out conductor and the second lead-out conductor is formed by burning the first coating film.

Furthermore, a second base electrode that extends from the second end surface of the body over portions of the first main surface, the second main surface, the first side surface, and the second side surface and is connected to the third lead-out conductor and the fourth lead-out conductor is formed by burning the second coating film.

A temperature at which the first coating film and the second coating film are burnt is, for example, 800° C. or more and 820° C. or less (i.e., from 800° C. to 820° C.).

A thickness of the first base electrode and the second base electrode is, for example, 5 pm.

Then, an Ni plating electrode and an Sn plating electrode are sequentially formed on a surface of the first base electrode by electrolytic plating or the like. In this way, the first outer electrode having the first base electrode, the Ni plating electrode, and the Sn plating electrode in this order from a body surface side is formed.

Furthermore, an Ni plating electrode and an Sn plating electrode are sequentially formed on a surface of the second base electrode by electrolytic plating or the like. In this way, the second outer electrode having the second base electrode, the Ni plating electrode, and the Sn plating electrode in this order from a body surface side is formed.

In this way, the first outer electrode electrically connected to the coil by the first lead-out conductor and the second lead-out conductor and the second outer electrode electrically connected to the coil by the first lead-out conductor and the second lead-out conductor different from the ones connected to the first outer electrode are formed on surfaces of the body.

The laminated coil component 1 is thus produced.

Although an aspect in which both of the coil conductor Q1 and the coil conductor Q14, which are outermost coil conductors, satisfy the feature "the outermost coil conductor is electrically connected to the same outer electrode by the first lead-out conductor at one end of the first parallel section and by the second lead-out conductor at the other end of the first parallel section" of the laminated coil component according to the present disclosure has been illustrated in the laminated coil component 1, it is only necessary that at least one of the coil conductor Q1 and the coil conductor Q14 satisfy the feature of the laminated coil component according to the present disclosure. That is, only the coil conductor Q1 may satisfy the feature of the laminated coil component according to the present disclosure, only the coil conductor Q14 may satisfy the feature of the laminated coil component according to the present disclosure, or both of the coil conductor Q1 and the coil conductor Q14 may satisfy the feature of the laminated coil component according to the present disclosure as described above.

Second Embodiment

In the laminated coil component according to the present disclosure, the outermost coil conductor is preferably electrically connected to the same outer electrode connected to the first lead-out conductor and the second lead-out conductor by a lead-out conductor different from the first lead-out conductor and the second lead-out conductor in a region different from the first parallel section. In this case, in the laminated coil component according to the present disclosure, the outermost coil conductor is preferably electrically connected to the same outer electrode connected to the first lead-out conductor and the second lead-out conductor by a third lead-out conductor in a region different from the first parallel section, and a region where the third lead-out conductor and the outermost coil conductor overlap each other preferably overlaps a region where two adjacent coil conductors including the outermost coil conductor overlap each other with the via conductor interposed therebetween when viewed in the laminating direction. A laminated coil component according to an aspect different from the laminated coil component according to the first embodiment of the present disclosure in this respect is described as a laminated coil component according to a second embodiment of the present disclosure.

Figure 6:
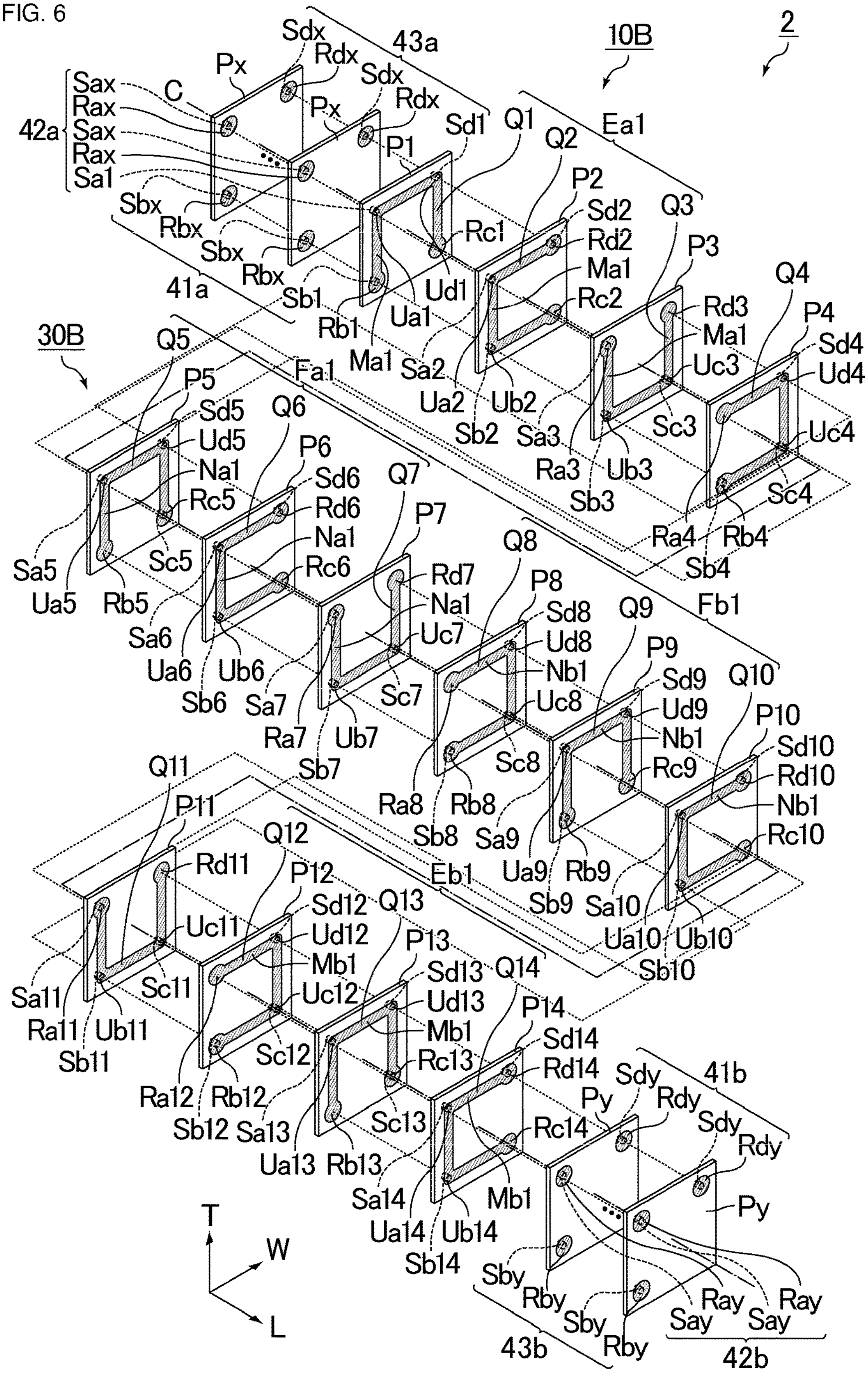
FIG. 6 is a perspective schematic view illustrating an example of an exploded state of a laminated coil component (excluding outer electrodes) according to a second embodiment of the present disclosure.
Figure 7:
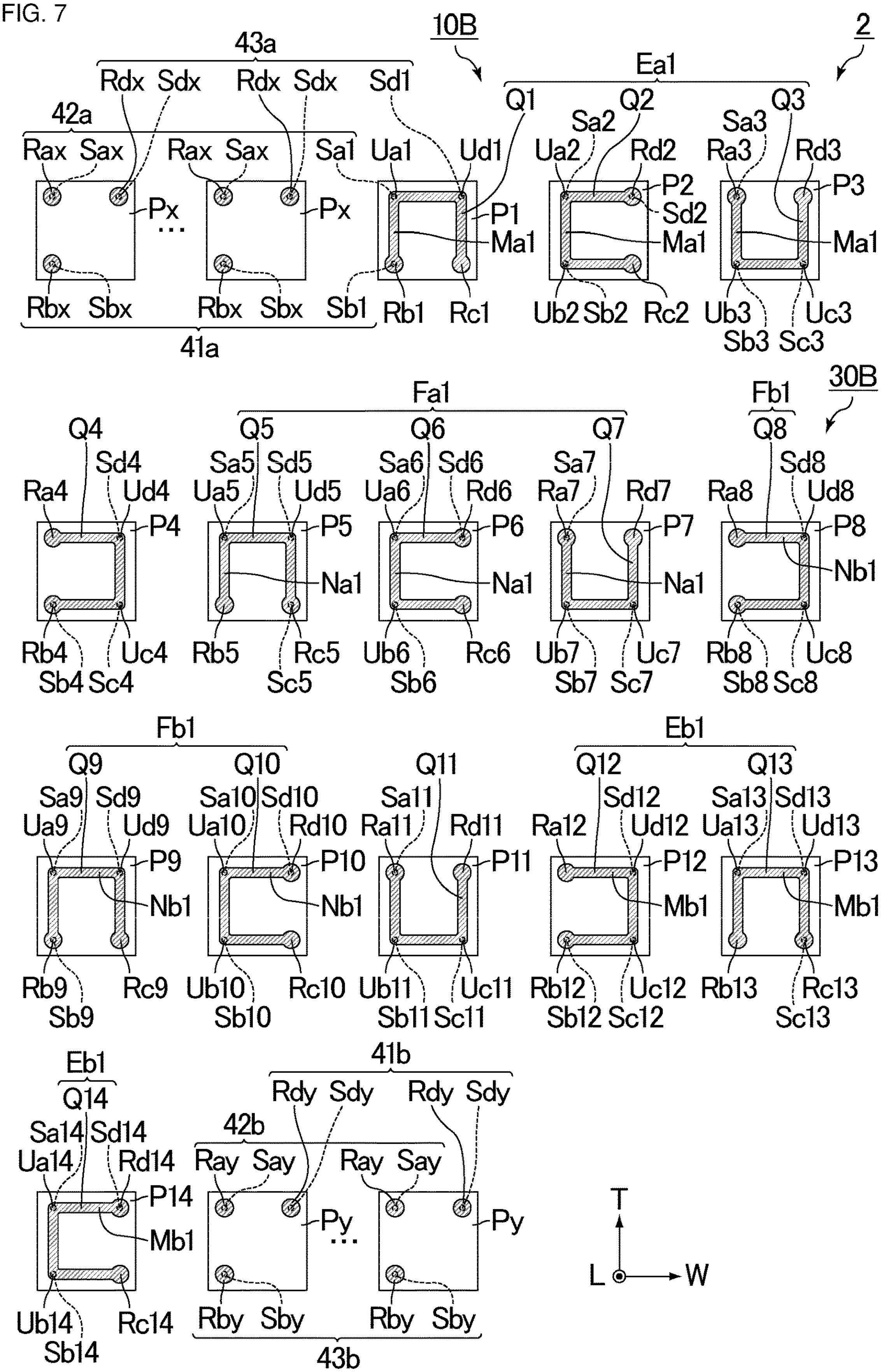
FIG. 7 is a plan schematic view illustrating an example of an exploded state of the laminated coil component (excluding outer electrodes) illustrated in FIG. 6.

FIG. 6 is a perspective schematic view illustrating an example of an exploded state of the laminated coil component (excluding outer electrodes) according to the second embodiment of the present disclosure. FIG. 7 is a plan schematic view illustrating an example of an exploded state of the laminated coil component (excluding outer electrodes) illustrated in FIG. 6.

In a laminated coil component 2 illustrated in FIGS. 6 and 7, a body 10B is similar to the body 10A (see FIGS. 2 and 3).

A coil 30B is provided in the body 10B.

The coil 30B is similar to the coil 30A (see FIGS. 2 and 3) except for a configuration described below.

Aland portion Rd2 is connected to a via conductor Sd2 that penetrates an insulating layer P2 in a length direction L. The via conductor Sd2 is also connected to a bent portion Udl in addition to the land portion Rd2. That is, the bent portion Udl and the land portion Rd2 are electrically connected by the via conductor Sd2.

In the laminated coil component 2, a coil conductor Q1, which is an outermost coil conductor, is electrically connected to a same first outer electrode 21 connected to a first lead-out conductor 41*a* and a second lead-out conductor 42*a* by a third lead-out conductor 43*a* in a region different from a first parallel section Ma1.

The third lead-out conductor 43*a* is configured as follows.

On a main surface of an insulating layer Px, a lead-out land portion Rdx is provided at a position apart from a lead-out land portion Rax and a lead-out land portion Rbx. The lead-out land portion Rdx is connected to a lead-out via conductor Sdx that penetrates the insulating layer Px in the length direction L. The lead-out land portion Rdx is also connected to a lead-out via conductor Sd1 that penetrates an insulating layer P1 in the length direction L in addition to the lead-out via conductor Sdx. This forms a third lead-out conductor 43*a* including the lead-out land portion Rdx, the lead-out via conductor Sdx, and the lead-out via conductor Sd1.

The lead-out via conductor Sd1 is also connected to the bent portion Udl in addition to the lead-out land portion Rdx. That is, the coil conductor Q1, which is an outermost coil conductor, is connected to the third lead-out conductor 43*a* at the bent portion Udl located in a region different from the first parallel section Ma1. In this way, the third lead-out conductor 43*a* is connected to the coil 30B.

The third lead-out conductor 43*a* is connected to the first outer electrode 21 in a similar manner to the first lead-out conductor 41*a* and the second lead-out conductor 42*a*. A cross-sectional view illustrating a manner of connection between the third lead-out conductor 43*a* and the first outer electrode 21 is similar to FIG. 4, which is a cross-sectional view illustrating a manner of connection between the first lead-out conductor 41*a* and the first outer electrode 21.

Accordingly, in the laminated coil component 2, the coil 30B and the first outer electrode 21 are electrically connected by the third lead-out conductor 43*a* in addition to the first lead-out conductor 41*a* and the second lead-out conductor 42*a*. That is, in the laminated coil component 2, the coil conductor Q1, which is an outermost coil conductor, is electrically connected to the same first outer electrode 21 connected to the first lead-out conductor 41*a* and the second lead-out conductor 42*a* by the third lead-out conductor 43*a* in a region different from the first parallel section Ma1.

In the laminated coil component 2, since the coil conductor Q1, which is an outermost coil conductor, is electrically connected to the same first outer electrode 21 connected to the first lead-out conductor 41*a* and the second lead-out conductor 42*a* by the third lead-out conductor 43*a* in a region different from the first parallel section Ma1, three current paths, specifically the first lead-out conductor 41*a*, the second lead-out conductor 42*a*, and the third lead-out conductor 43*a* can be provided between the coil 30B and the first outer electrode 21. Accordingly, in the laminated coil component 2, a current density of the first lead-out conductor 41*a* and the second lead-out conductor 42*a* can be lowered as compared with the laminated coil component 1. Therefore, in the laminated coil component 2, for example, even in a case where a large current is passed between the coil 30B and the first outer electrode 21, heat generation and electrochemical migration can be made less likely to occur in the first lead-out conductor 41*a* and the second lead-out conductor 42*a* and as a result, disconnection of the first lead-out conductor 41*a* and the second lead-out conductor 42*a* can be made less likely to occur as compared with the laminated coil component 1.

The coil conductor Q1, which is an outermost coil conductor, is connected to the third lead-out conductor 43*a* at the bent portion Udl. That is, the bent portion Udl overlaps the third lead-out conductor 43*a* when viewed in the length direction L.

Meanwhile, two adjacent coil conductors including the coil conductor Q1, which is an outermost coil conductor, specifically the coil conductor Q1 and a coil conductor Q2 are electrically connected by the via conductor Sd2 at the bent portion Udl and the land portion Rd2. That is, the bent portion Udl and the land portion Rd2 overlap each other with the via conductor Sd2 interposed therebetween when viewed in the length direction L.

Accordingly, in the laminated coil component 2, the third lead-out conductor 43*a*, the bent portion Udl, and the land portion Rd2 overlap each other when viewed in the length direction L. In this way, in the laminated coil component 2, a region where the third lead-out conductor 43*a* and the coil conductor Q1, which is an outermost coil conductor, overlap each other overlaps a region where the two adjacent coil conductors Q1 and Q2 including the coil conductor Q1, which is an outermost coil conductor, overlap each other with the via conductor Sd2 interposed therebetween when viewed in the length direction L. This can shorten a current path between the region where the coil conductor Q1 and the coil conductor Q2 overlap each other with the via conductor Sd2 interposed therebetween and the third lead-out conductor 43*a*, thereby lowering direct-current resistance of the current path.

In the laminated coil component 2, a coil conductor Q14, which is an outermost coil conductor, is electrically connected to a same second outer electrode 22 connected to a first lead-out conductor 41*b* and a second lead-out conductor 42*b* by a third lead-out conductor 43*b* in a region different from a first parallel section Mb1.

The third lead-out conductor 43*b* is configured as follows.

On a main surface of an insulating layer Py, a lead-out land portion Rby is provided at a position apart from a lead-out land portion Ray and a lead-out land portion Rdy. The lead-out land portion Rby is connected to a lead-out via conductor Sby that penetrates the insulating layer Py in the length direction L. This forms a third lead-out conductor 43*b* including the lead-out land portion Rby and the lead-out via conductor Sby.

The lead-out via conductor Sby is also connected to a bent portion Ub14 in addition to the lead-out land portion Rby. That is, the coil conductor Q14, which is an outermost coil conductor, is connected to the third lead-out conductor 43*b* at the bent portion Ub14 located in a region different from the first parallel section Mb1. In this way, the third lead-out conductor 43*b* is connected to the coil 30B.

The third lead-out conductor 43*b* is connected to the second outer electrode 22 in a similar manner to the first lead-out conductor 41*b* and the second lead-out conductor 42*b*. A cross-sectional view illustrating a manner of connection between the third lead-out conductor 43*b* and the second outer electrode 22 is similar to FIG. 5, which is a cross-sectional view illustrating a manner of connection between the first lead-out conductor 41*b* and the second outer electrode 22.

Accordingly, in the laminated coil component 2, the coil 30B and the second outer electrode 22 are electrically connected by the third lead-out conductor 43*b* in addition to the first lead-out conductor 41*b* and the second lead-out conductor 42*b*. That is, in the laminated coil component 2, the coil conductor Q14, which is an outermost coil conductor, is electrically connected to the same second outer electrode 22 connected to the first lead-out conductor 41*b* and the second lead-out conductor 42*b* by the third lead-out conductor 43*b* in a region different from the first parallel section Mb1.

In the laminated coil component 2, since the coil conductor Q14, which is an outermost coil conductor, is electrically connected to the same second outer electrode 22 connected to the first lead-out conductor 41*b* and the second lead-out conductor 42*b* by the third lead-out conductor 43*b* in a region different from the first parallel section Mb1, three current paths, specifically the first lead-out conductor 41*b*, the second lead-out conductor 42*b*, and the third lead-out conductor 43*b* can be provided between the coil 30B and the second outer electrode 22. Therefore, in the laminated coil component 2, a current density of the first lead-out conductor 41*b* and the second lead-out conductor 42*b* can be lowered as compared with the laminated coil component 1. Therefore, in the laminated coil component 2, for example, even in a case where a large current is passed between the coil 30B and the second outer electrode 22, heat generation and electrochemical migration can be made less likely to occur in the first lead-out conductor 41*b* and the second lead-out conductor 42*b* and as a result, disconnection of the first lead-out conductor 41*b* and the second lead-out conductor 42*b* can be made less likely to occur as compared with the laminated coil component 1.

The coil conductor Q14, which is an outermost coil conductor, is connected to the third lead-out conductor 43*b* at the bent portion Ub14. That is, the bent portion Ub14 overlaps the third lead-out conductor 43*b* when viewed in the length direction L.

Meanwhile, two adjacent coil conductors including the coil conductor Q14, which is an outermost coil conductor, specifically the coil conductor Q13 and the coil conductor Q14 are electrically connected by the via conductor Sb14 at the land portion Rb13 and the bent portion Ub14. That is, the land portion Rb13 and the bent portion Ub14 overlap each other with the via conductor Sb14 interposed therebetween when viewed in the length direction L.

Accordingly, in the laminated coil component 2, the third lead-out conductor 43*b*, the bent portion Ub14, and the land portion Rb13 overlap each other when viewed in the length direction L. In this way, in the laminated coil component 2, a region where the third lead-out conductor 43*b* and the coil conductor Q14, which is an outermost coil conductor, overlap each other overlaps a region where the two adjacent coil conductors Q13 and Q14 including the coil conductor Q14, which is an outermost coil conductor, overlap each other with the via conductor Sb14 interposed therebetween when viewed in the length direction L. This can shorten a current path between the region where the coil conductor Q13 and the coil conductor Q14 overlap each other with the via conductor Sb14 interposed therebetween and the third lead-out conductor 43*b*, thereby lowering direct-current resistance of the current path.

The laminated coil component 2 is, for example, produced by a similar method to the laminated coil component 1 except for that conductor patterns corresponding to the coil conductors, the via conductors, the lead-out land portions, and the lead-out via conductors illustrated in FIGS. 6 and 7 are formed in/on the coil sheets and the via sheets in the Process for Forming Conductor Patterns.

Although an aspect in which both of the third lead-out conductor 43*a* and the third lead-out conductor 43*b* are provided has been illustrated in the laminated coil component 2, only the third lead-out conductor 43*a* may be provided or only the third lead-out conductor 43*b* may be provided.

Third Embodiment

In the laminated coil component according to the present disclosure, the outermost coil conductor is preferably electrically connected to the same outer electrode connected to the first lead-out conductor and the second lead-out conductor by a lead-out conductor different from the first lead-out conductor and the second lead-out conductor in a region different from the first parallel section. In this case, in the laminated coil component according to the present disclosure, the outermost coil conductor is preferably electrically connected to the outer electrode connected to the first lead-out conductor and the second lead-out conductor by a fourth lead-out conductor in a region different from the first parallel section, and a region where the fourth lead-out conductor and the outermost coil conductor overlap each other preferably overlaps a region where two adjacent coil conductors including the outermost coil conductor do not overlap each other with the via conductor interposed therebetween when viewed in the laminating direction. A laminated coil component according to an aspect different from the laminated coil component according to the second embodiment of the present disclosure in this respect is described below as a laminated coil component according to a third embodiment of the present disclosure.

Figure 8:
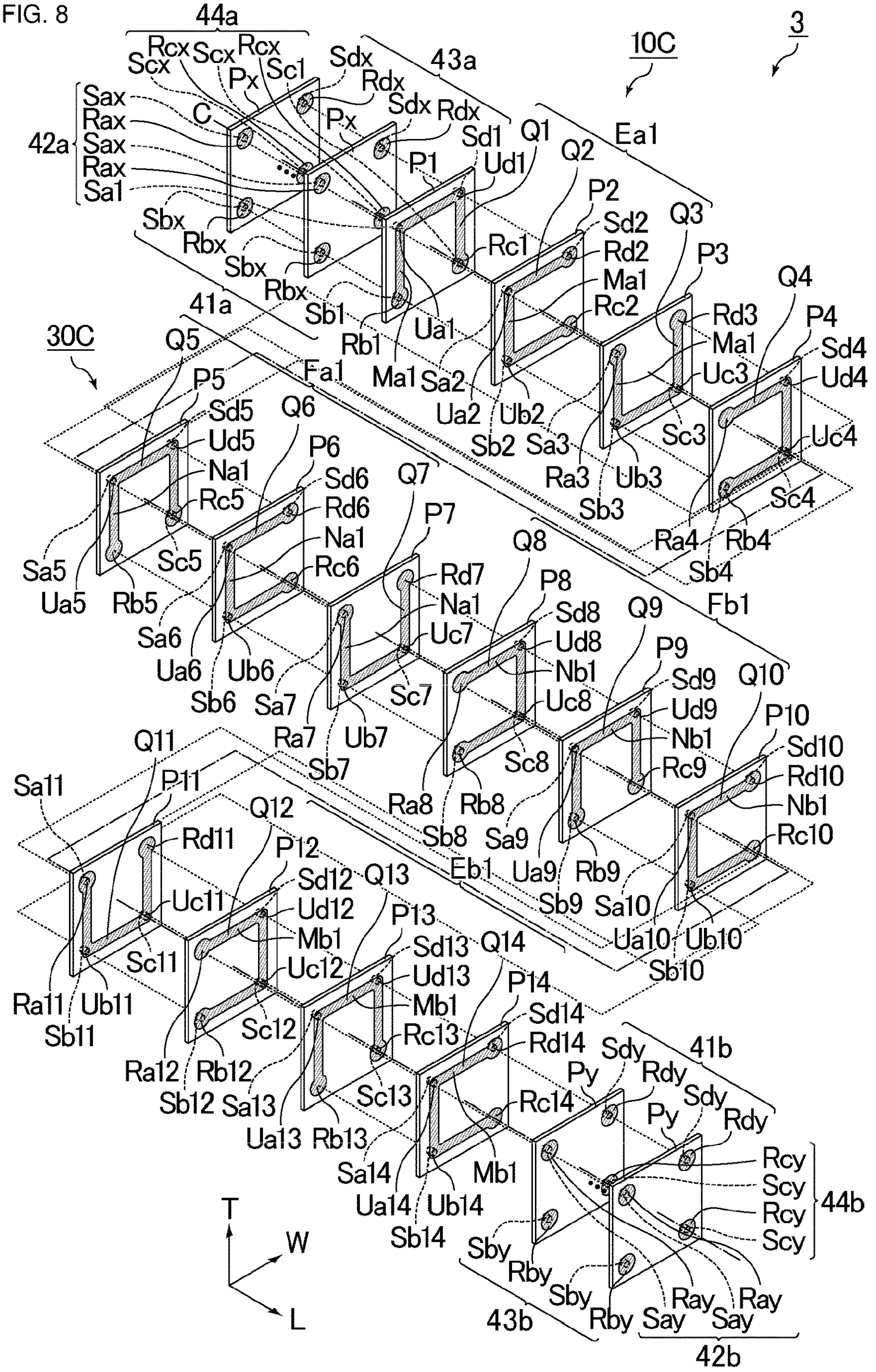
FIG. 8 is a perspective schematic view illustrating an example of an exploded state of a laminated coil component (excluding outer electrodes) according to a third embodiment of the present disclosure.
Figure 9:
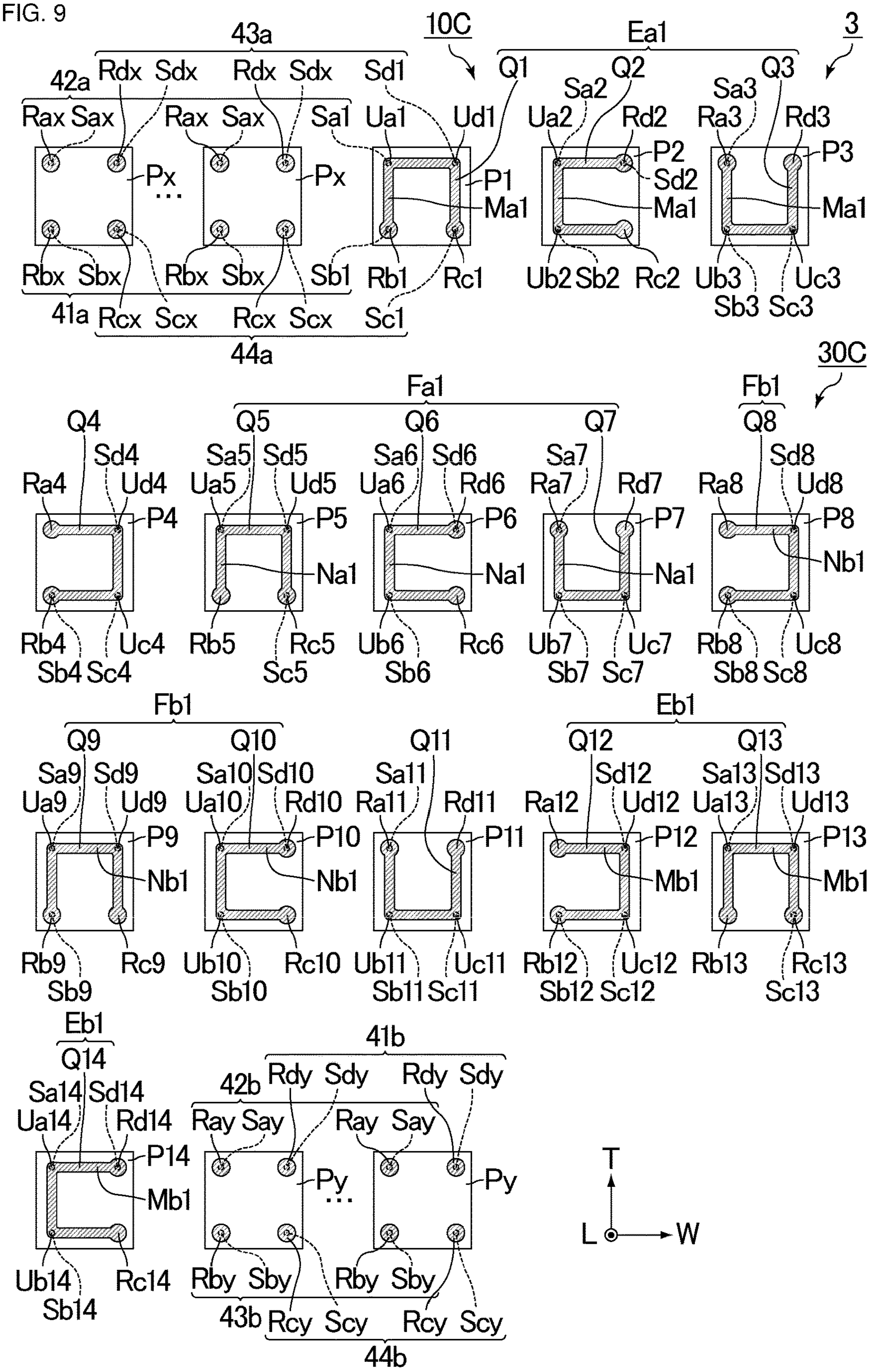
FIG. 9 is a plan schematic view illustrating an example of an exploded state of the laminated coil component (excluding outer electrodes) illustrated in FIG. 8.

FIG. 8 is a perspective schematic view illustrating an example of an exploded state of a laminated coil component (excluding outer electrodes) according to the third embodiment of the present disclosure. FIG. 9 is a plan schematic view illustrating an example of an exploded state of the laminated coil component (excluding outer electrodes) illustrated in FIG. 8.

In a laminated coil component 3 illustrated in FIGS. 8 and 9, a body 10C is similar to the body 10B (see FIGS. 6 and 7).

A coil 30C is provided in the body 10C.

The coil 30C is similar to the coil 30B (see FIGS. 6 and 7).

In the laminated coil component 3, a coil conductor Q1, which is an outermost coil conductor, is electrically connected to a same first outer electrode 21 connected to a first lead-out conductor 41*a*, a second lead-out conductor 42*a*, and a third lead-out conductor 43*a* by a fourth lead-out conductor 44*a* in a region different from a first parallel section Ma1.

The fourth lead-out conductor 44*a* is configured as follows.

On a main surface of an insulating layer Px, a lead-out land portion Rcx is provided at a position apart from a lead-out land portion Rax, a lead-out land portion Rbx, and a lead-out land portion Rdx. The lead-out land portion Rcx is connected to a lead-out via conductor Scx that penetrates the insulating layer Px in a length direction L. The lead-out land portion Rcx is also connected to a lead-out via conductor Sc1 that penetrates an insulating layer P1 in the length direction L in addition to the lead-out via conductor Scx. This forms a fourth lead-out conductor 44*a* including the lead-out land portion Rcx, the lead-out via conductor Scx, and the lead-out via conductor Sc1.

The lead-out via conductor Sc1 is also connected to a land portion Rc1 in addition to the lead-out land portion Rcx. That is, the coil conductor Q1, which is an outermost coil conductor, is connected to the fourth lead-out conductor 44*a* at the land portion Rc1 located in a region different from the first parallel section Ma1. In this way, the fourth lead-out conductor 44*a* is connected to the coil 30C.

The fourth lead-out conductor 44*a* is connected to the first outer electrode 21 in a similar manner to the first lead-out conductor 41*a*, the second lead-out conductor 42*a*, and the third lead-out conductor 43*a*. A cross-sectional view illustrating a manner of connection between the fourth lead-out conductor 44*a* and the first outer electrode 21 is similar to FIG. 4, which is a cross-sectional view illustrating a manner of connection between the first lead-out conductor 41*a* and the first outer electrode 21.

Accordingly, in the laminated coil component 3, the coil 30C and the first outer electrode 21 are electrically connected by the fourth lead-out conductor 44*a* in addition to the first lead-out conductor 41*a*, the second lead-out conductor 42*a*, and the third lead-out conductor 43*a*. That is, in the laminated coil component 3, the coil conductor Q1, which is an outermost coil conductor, is electrically connected to the same first outer electrode 21 connected to the first lead-out conductor 41*a*, the second lead-out conductor 42*a*, and the third lead-out conductor 43*a* by the fourth lead-out conductor 44*a* in a region different from the first parallel section Ma1.

In the laminated coil component 3, since the coil conductor Q1, which is an outermost coil conductor, is electrically connected to the same first outer electrode 21 connected to the first lead-out conductor 41*a*, the second lead-out conductor 42*a*, and the third lead-out conductor 43*a* by the fourth lead-out conductor 44*a* in a region different from the first parallel section Ma1, four current paths, specifically, the first lead-out conductor 41*a*, the second lead-out conductor 42*a*, the third lead-out conductor 43*a*, and the fourth lead-out conductor 44*a* can be provided between the coil 30C and the first outer electrode 21. Accordingly, in the laminated coil component 3, a current density of the first lead-out conductor 41*a*, the second lead-out conductor 42*a*, and the third lead-out conductor 43*a* can be lowered as compared with the laminated coil component 2. Therefore, in the laminated coil component 3, for example, even in a case where a large current is passed between the coil 30C and the first outer electrode 21, heat generation and electrochemical migration can be made less likely to occur in the first lead-out conductor 41*a*, the second lead-out conductor 42*a*, and the third lead-out conductor 43*a* and as a result, disconnection of the first lead-out conductor 41*a*, the second lead-out conductor 42*a*, and the third lead-out conductor 43*a* can be made less likely to occur as compared with the laminated coil component 2.

The coil conductor Q1, which is an outermost coil conductor, is connected to the fourth lead-out conductor 44*a* at the land portion Rc1. That is, the land portion Rc1 overlaps the fourth lead-out conductor 44*a* when viewed in the length direction L.

Meanwhile, two adjacent coil conductors including the coil conductor Q1, which is an outermost coil conductor, specifically the coil conductor Q1 and a coil conductor Q2 are not electrically connected by a via conductor at the land portion Rc1 and a land portion Rc2. That is, the land portion Rc1 and the land portion Rc2 do not overlap each other with a via conductor interposed therebetween when viewed in the length direction L.

Accordingly, in the laminated coil component 3, a region where the fourth lead-out conductor 44*a* and the coil conductor Q1, which is an outermost coil conductor, overlap each other overlaps a region where the two adjacent coil conductors Q1 and Q2 including the coil conductor Q1, which is an outermost coil conductor, do not overlap each other with a via conductor interposed therebetween when viewed in the length direction L. This can shorten a current path between the region where the coil conductor Q1 and the coil conductor Q2 do not overlap each other with a via conductor interposed therebetween, that is, a non-parallel section where the coil conductor Q1 and the coil conductor Q2 do not overlap each other when viewed in the length direction L and the fourth lead-out conductor 44*a*, thereby lowering direct-current resistance of the current path.

In the laminated coil component 3, a coil conductor Q14, which is an outermost coil conductor, is electrically connected to a same second outer electrode 22 connected to a first lead-out conductor 41*b*, a second lead-out conductor 42*b*, and a third lead-out conductor 43*b* by a fourth lead-out conductor 44*b* in a region different from a first parallel section Mb1.

The fourth lead-out conductor 44*b* is configured as follows.

On a main surface of an insulating layer Py, a lead-out land portion Rcy is provided at a position apart from a lead-out land portion Ray, a lead-out land portion Rby, and a lead-out land portion Rdy. The lead-out land portion Rcy is connected to a lead-out via conductor Scy that penetrates the insulating layer Py in the length direction L. This forms a fourth lead-out conductor 44*b* including the lead-out land portion Rcy and the lead-out via conductor Scy.

The lead-out via conductor Scy is also connected to a land portion Rc14 in addition to the lead-out land portion Rcy. That is, the coil conductor Q14, which is an outermost coil conductor, is connected to the fourth lead-out conductor 44*b* at the land portion Rc14 located in a region different from the first parallel section Mb1. In this way, the fourth lead-out conductor 44*b* is connected to the coil 30C.

The fourth lead-out conductor 44*b* is connected to the second outer electrode 22 in a similar manner to the first lead-out conductor 41*b*, the second lead-out conductor 42*b*, and the third lead-out conductor 43*b*. A cross-sectional view illustrating a manner of connection between the fourth lead-out conductor 44*b* and the second outer electrode 22 is similar to FIG. 5, which is a cross-sectional view illustrating a manner of connection between the first lead-out conductor 41*b* and the second outer electrode 22.

Accordingly, in the laminated coil component 3, the coil 30C and the second outer electrode 22 are electrically connected by the fourth lead-out conductor 44*b* in addition to the first lead-out conductor 41*b*, the second lead-out conductor 42*b*, and the third lead-out conductor 43*b*. That is, in the laminated coil component 3, the coil conductor Q14, which is an outermost coil conductor, is electrically connected to the same second outer electrode 22 connected to the first lead-out conductor 41*b*, the second lead-out conductor 42*b*, and the third lead-out conductor 43*b* by the fourth lead-out conductor 44*b* in a region different from the first parallel section Mb1.

In the laminated coil component 3, since the coil conductor Q14, which is an outermost coil conductor, is electrically connected to the same second outer electrode 22 connected to the first lead-out conductor 41*b*, the second lead-out conductor 42*b*, and the third lead-out conductor 43*b* by the fourth lead-out conductor 44*b* in a region different from the first parallel section Mb1, four current paths, specifically the first lead-out conductor 41*b*, the second lead-out conductor 42*b*, the third lead-out conductor 43*b*, and the fourth lead-out conductor 44*b* can be provided between the coil 30C and the second outer electrode 22. Accordingly, in the laminated coil component 3, a current density of the first lead-out conductor 41*b*, the second lead-out conductor 42*b*, and the third lead-out conductor 43*b* can be lowered as compared with the laminated coil component 2. Therefore, in the laminated coil component 3, for example, even in a case where a large current is passed between the coil 30C and the second outer electrode 22, heat generation and electrochemical migration can be made less likely to occur in the first lead-out conductor 41*b*, the second lead-out conductor 42*b*, and the third lead-out conductor 43*b* and as a result, disconnection of the first lead-out conductor 41*b*, the second lead-out conductor 42*b*, and the third lead-out conductor 43*b* can be made less likely to occur as compared with the laminated coil component 2.

The coil conductor Q14, which is an outermost coil conductor, is connected to the fourth lead-out conductor 44*b* at the land portion Rc14. That is, the land portion Rc14 overlaps the fourth lead-out conductor 44*b* when viewed in the length direction L.

Meanwhile, two adjacent coil conductors including the coil conductor Q14, which is an outermost coil conductor, specifically a coil conductor Q13 and the coil conductor Q14 are not electrically connected by a via conductor at a land portion Rc13 and the land portion Rc14. That is, the land portion Rc13 and the land portion Rc14 do not overlap each other with a via conductor interposed therebetween when viewed in the length direction L.

Accordingly, in the laminated coil component 3, a region where the fourth lead-out conductor 44*b* and the coil conductor Q14, which is an outermost coil conductor, overlap each other overlaps a region where the two adjacent coil conductors Q13 and Q14 including the coil conductor Q14, which is an outermost coil conductor, do not overlap each other with a via conductor interposed therebetween when viewed in the length direction L. This can shorten a current path between the region where the coil conductor Q13 and the coil conductor Q14 do not overlap each other with a via conductor interposed therebetween, that is, a non-parallel section where the coil conductor Q13 and the coil conductor Q14 do not overlap each other when viewed in the length direction L and the fourth lead-out conductor 44*b*, thereby lowering direct-current resistance of the current path.

The laminated coil component 3 is, for example, produced by a method similar to the laminated coil component 2 except for that conductor patterns corresponding to the coil conductors, the via conductors, the lead-out land portions, and the lead-out via conductors illustrated in FIGS. 8 and 9 are formed on/in the coil sheets and the via sheets in the Process for Forming Conductor Patterns.

Although an aspect in which both of the fourth lead-out conductor 44*a* and the fourth lead-out conductor 44*b* are provided has been illustrated in the laminated coil component 3, only the fourth lead-out conductor 44*a* may be provided or only the fourth lead-out conductor 44*b* may be provided.

Although an aspect in which both of the third lead-out conductor 43*a* and the fourth lead-out conductor 44*a* are provided on the first outer electrode 21 side has been illustrated in the laminated coil component 3, only the third lead-out conductor 43*a* may be provided or only the fourth lead-out conductor 44*a* may be provided.

Although an aspect in which both of the third lead-out conductor 43*b* and the fourth lead-out conductor 44*b* are provided on the second outer electrode 22 side has been illustrated in the laminated coil component 3, only the third lead-out conductor 43*b* may be provided or only the fourth lead-out conductor 44*b* may be provided.

Although an aspect in which three coil conductors are connected in parallel in each of first and second parallel sections has been illustrated in the above embodiments, the same applies to an aspect in which two coil conductors are connected in parallel in each of first and second parallel sections, and the same applies to an aspect in which four or more coil conductors are connected in parallel in each of first and second parallel sections. In particular, from a perspective of lowering direct-current resistance of the coil, three or more coil conductors are preferably connected in parallel in each of first and second parallel sections. That is, in the laminated coil component according to the present disclosure, the first laminated part preferably includes three or more coil conductors. Furthermore, in the laminated coil component according to the present disclosure, the second laminated part preferably includes three or more coil conductors.

EXAMPLES

Examples specifically disclosing the laminated coil component according to the present disclosure are described below. Note that the present disclosure is not limited to Examples below.

Example 1

The laminated coil component according to the first embodiment was employed as a simulation model of a laminated coil component of Example 1 (hereinafter simply referred to as a "laminated coil component of Example 1").

In the laminated coil component of Example 1, a dimension in the length direction was set to 2.0 mm, a dimension in the height direction was set to 1.25 mm, and a dimension in the width direction was set to 1.25 mm.

In the laminated coil component of Example 1, a dimension of all coil conductors in the length direction was set to 21 um, and a dimension of all coil conductors in the width direction was set to 300 um.

In the laminated coil component of Example 1, a diameter of all lead-out via conductors that constitute the first lead-out conductor and the second lead-out conductor connected to the first outer electrode was set to 170 um. Furthermore, in the laminated coil component of Example 1, a diameter of all lead-out via conductors that constitute the first lead-out conductor and the second lead-out conductor connected to the second outer electrode was set to 170 um.

Example 2

The laminated coil component according to the third embodiment was employed as a simulation model of a laminated coil component of Example 2 (hereinafter simply referred to as a "laminated coil component of Example 2").

In the laminated coil component of Example 2, a dimension in the length direction was set to 2.0 mm, a dimension in the height direction was set to 1.25 mm, and a dimension in the width direction was set to 1.25 mm, as in the laminated coil component of Example 1.

In the laminated coil component of Example 2, a dimension of all coil conductors in the length direction was set to 21 μm, and a dimension of all coil conductors in the width direction was set to 300 μm, as in the laminated coil component of Example 1.

In the laminated coil component of Example 2, a diameter of all lead-out via conductors that constitute the first lead-out conductor, the second lead-out conductor, the third lead-out conductor, and the fourth lead-out conductor connected to the first outer electrode was set to 170 μm. Furthermore, in the laminated coil component of Example 2, a diameter of all lead-out via conductors that constitute the first lead-out conductor, the second lead-out conductor, the third lead-out conductor, and the fourth lead-out conductor connected to the second outer electrode was set to 170 μm.

Comparative Example 1

A configuration obtained by excluding the first lead-out conductor connected to the first outer electrode and the first lead-out conductor connected to the second outer electrode from the laminated coil component of Example 1 was employed as a simulation model of a laminated coil component of Comparative Example 1 (hereinafter simply referred to as a "laminated coil component of Comparative Example 1").

In the laminated coil component of Comparative Example 1, a dimension in the length direction was set to 2.0 mm, a dimension in the height direction was set to 1.25 mm, and a dimension in the width direction was set to 1.25 mm, as in the laminated coil component of Example 1.

In the laminated coil component of Comparative Example 1, a dimension of all coil conductors in the length direction was set to 21 μm, and a dimension of all coil conductors in the width direction was set to 300 μm, as in the laminated coil component of Example 1.

In the laminated coil component of Comparative Example 1, a diameter of a lead-out via conductor that constitutes the second lead-out conductor connected to the first outer electrode was set to 170 μm. Furthermore, in the laminated coil component of Comparative Example 1, a diameter of a lead-out via conductor that constitutes the second lead-out conductor connected to the second outer electrode was set to 170 μm.

Evaluation

Simulation evaluation of a current value flowing through a lead-out conductor was conducted as for the laminated coil component of Example 1, the laminated coil component of Example 2, and the laminated coil component of Comparative Example 1. In a case where a current value (current density) flowing through the second lead-out conductor of the laminated coil component of Comparative Example 1 is 100%, current values flowing through the lead-out conductors of the laminated coil component of Example 1 and current values flowing through the lead-out conductors of the laminated coil component of Example 2 were as follows.

Example 1 first lead-out conductor: 77%
second lead-out conductor: 23%

Example 2 first lead-out conductor: 74%
second lead-out conductor: 15%
third lead-out conductor: 7%
fourth lead-out conductor: 4%

In the laminated coil component of Example 1 and the laminated coil component of Example 2, a current value (current density) per lead-out conductor was lower than that in the laminated coil component of Comparative Example 1. Therefore, in the laminated coil component of Example 1 and the laminated coil component of Example 2, heat generation and electrochemical migration in a lead-out conductor are kept less likely to occur and as a result disconnection of the lead-out conductor is kept less likely to occur as compared with the laminated coil component of Comparative Example 1. Furthermore, in the laminated coil component of Example 1 and the laminated coil component of Example 2, even if disconnection occurs in the first lead-out conductor where a current value becomes maximum, functions of the laminated coil component can be maintained by another lead-out conductor.

In the laminated coil component of Example 2, current values (current densities) of the first lead-out conductor and the second lead-out conductor were lower than those in the laminated coil component of Example 1. Therefore, in the laminated coil component of Example 2, heat generation and electrochemical migration in the first lead-out conductor and the second lead-out conductor are kept less likely to occur and as a result disconnection of the first lead-out conductor and the second lead-out conductor is kept less likely to occur as compared with the laminated coil component of Example 1.

What is claimed is:

1. A laminated coil component comprising:

a body in which a plurality of insulating layers are laminated in a laminating direction;

a coil in the body; and an outer electrode on a surface of the body and electrically connected to the coil, wherein the coil includes a plurality of coil conductors laminated in the laminating direction that are electrically connected by a via conductor that penetrates the insulating layers in the laminating direction, the plurality of coil conductors laminated in the laminating direction includes a first laminated part including a plurality of adjacent coil conductors including an outermost coil conductor at an outermost position in the laminating direction among the plurality of coil conductors, the first laminated part has a first parallel section in which all of the coil conductors of the first laminated part overlap each other when viewed in the laminating direction, the coil conductors in the first parallel section are connected in parallel by the via conductor, and the outermost coil conductor is electrically connected to the same outer electrode by a first lead-out conductor at one end of the first parallel section and by a second lead-out conductor at an other end of the first parallel section.

2. The laminated coil component according to claim 1, wherein the first laminated part includes three or more coil conductors.

3. The laminated coil component according to claim 2, wherein a region where the first lead-out conductor and the outermost coil conductor overlap each other overlaps a region where four adjacent coil conductors including the outermost coil conductor overlap each other with the via conductor interposed therebetween when viewed in the laminating direction; and a region where the second lead-out conductor and the outermost coil conductor overlap each other overlaps a region where three adjacent coil conductors including the outermost coil conductor overlap each other with the via conductor interposed therebetween when viewed in the laminating direction.

4. The laminated coil component according to claim 3, wherein the outermost coil conductor is electrically connected to the same outer electrode connected to the first lead-out conductor and the second lead-out conductor by a lead-out conductor different from the first lead-out conductor and the second lead-out conductor in a region different from the first parallel section.

5. The laminated coil component according to claim 3, wherein a length of all of the coil conductors of the first laminated part is a length of ¾ of a turn of the coil.

6. The laminated coil component according to claim 3, wherein the plurality of coil conductors laminated in the laminating direction further includes a second laminated part including a same number of adjacent coil conductors as the first laminated part;

the second laminated part has second parallel sections in which all of the coil conductors of the second laminated part overlap each other when viewed in the laminating direction;

the second parallel sections are connected in parallel by the via conductor; and the first parallel sections and the second parallel sections overlap each other when viewed in the laminating direction.

7. The laminated coil component according to claim 3, wherein the laminating direction and a direction of a coil axis of the coil are parallel with a mount surface of the body along a same direction.

8. The laminated coil component according to claim 2, wherein the outermost coil conductor is electrically connected to the same outer electrode connected to the first lead-out conductor and the second lead-out conductor by a lead-out conductor different from the first lead-out conductor and the second lead-out conductor in a region different from the first parallel section.

9. The laminated coil component according to claim 8, wherein the outermost coil conductor is electrically connected to the same outer electrode connected to the first lead-out conductor and the second lead-out conductor by a third lead-out conductor in a region different from the first parallel section; and a region where the third lead-out conductor and the outermost coil conductor overlap each other overlaps a region where two adjacent coil conductors including the outermost coil conductor overlap each other with the via conductor interposed therebetween when viewed in the laminating direction.

10. The laminated coil component according to claim 9, wherein the outermost coil conductor is electrically connected to the same outer electrode connected to the first lead-out conductor and the second lead-out conductor by a fourth lead-out conductor in a region different from the first parallel section; and a region where the fourth lead-out conductor and the outermost coil conductor overlap each other overlaps a region where two adjacent coil conductors including the outermost coil conductor do not overlap each other with the via conductor interposed therebetween when viewed in the laminating direction.

11. The laminated coil component according to claim 8, wherein the outermost coil conductor is electrically connected to the same outer electrode connected to the first lead-out conductor and the second lead-out conductor by a fourth lead-out conductor in a region different from the first parallel section; and a region where the fourth lead-out conductor and the outermost coil conductor overlap each other overlaps a region where two adjacent coil conductors including the outermost coil conductor do not overlap each other with the via conductor interposed therebetween when viewed in the laminating direction.

12. The laminated coil component according to claim 2, wherein a length of all of the coil conductors of the first laminated part is a length of ¾ of a turn of the coil.

13. The laminated coil component according to claim 2, wherein the plurality of coil conductors laminated in the laminating direction further includes a second laminated part including a same number of adjacent coil conductors as the first laminated part;

the second laminated part has second parallel sections in which all of the coil conductors of the second laminated part overlap each other when viewed in the laminating direction;

the second parallel sections are connected in parallel by the via conductor; and the first parallel sections and the second parallel sections overlap each other when viewed in the laminating direction.

14. The laminated coil component according to claim 2, wherein the laminating direction and a direction of a coil axis of the coil are parallel with a mount surface of the body along a same direction.

15. The laminated coil component according to claim 1, wherein a length of all of the coil conductors of the first laminated part is a length of ¾ of a turn of the coil.

16. The laminated coil component according to claim 1, wherein the plurality of coil conductors laminated in the laminating direction further includes a second laminated part including a same number of adjacent coil conductors as the first laminated part;

the second laminated part has second parallel sections in which all of the coil conductors of the second laminated part overlap each other when viewed in the laminating direction;

the second parallel sections are connected in parallel by the via conductor; and the first parallel sections and the second parallel sections overlap each other when viewed in the laminating direction.

17. The laminated coil component according to claim 16, wherein the second laminated part includes three or more coil conductors.

18. The laminated coil component according to claim 17, wherein a length of all of the coil conductors of the second laminated part is a length of ¾ of a turn of the coil.

19. The laminated coil component according to claim 16, wherein a length of all of the coil conductors of the second laminated part is a length of ¾ of a turn of the coil.

20. The laminated coil component according to claim 1, wherein the laminating direction and a direction of a coil axis of the coil are parallel with a mount surface of the body along a same direction.

* * * * *